(12) United States Patent
Economy et al.

(10) Patent No.: US 11,388,570 B2
(45) Date of Patent: *Jul. 12, 2022

(54) METHOD OF PROGRAMMING A LOAD CONTROL DEVICE

(71) Applicant: Lutron Technology Company LLC, Coopersburg, PA (US)

(72) Inventors: Theodore F. Economy, Bethlehem, PA (US); John C. Browne, Jr., Bethlehem, PA (US); William Bryce Fricke, Bethlehem, PA (US); Galen Edgar Knode, Macungie, PA (US); Ryan S. Bedell, West Palm Beach, FL (US); Christopher J. Salvestrini, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,108

(22) Filed: Sep. 4, 2020

(65) Prior Publication Data

US 2020/0404767 A1 Dec. 24, 2020

Related U.S. Application Data

(63) Continuation of application No. 15/352,673, filed on Nov. 16, 2016, now Pat. No. 10,779,381, which is a
(Continued)

(51) Int. Cl.
*H04W 4/70* (2018.01)
*H05B 47/19* (2020.01)
*H05B 47/195* (2020.01)

(52) U.S. Cl.
CPC .............. *H04W 4/70* (2018.02); *H05B 47/19* (2020.01); *H05B 47/195* (2020.01); *Y02B 20/40* (2013.01)

(58) Field of Classification Search
CPC combination set(s) only.
See application file for complete search history.

(56) References Cited

U.S. PATENT DOCUMENTS 4,864,588 A 9/1989 Simpson et al.
4,932,037 A 6/1990 Simpson et al.
(Continued)

FOREIGN PATENT DOCUMENTS

CA 2892464 A1 11/2015
CN 101789978 A 7/2010
(Continued)

OTHER PUBLICATIONS

U.S. Appl. No. 16/030,310, filed Jul. 9, 2018.
(Continued)

*Primary Examiner* — Nabil H Syed
*Assistant Examiner* — Cal J Eustaquio
(74) *Attorney, Agent, or Firm* — Michael Czarnecki; Glen Farbanish; Philip Smith

(57) ABSTRACT

A load control device is able to receive radio-frequency (RF) signals from a Wi-Fi-enabled device, such as a smart phone, via a wireless local area network. The load control device comprises a controllably conductive device adapted to be coupled in series between an AC power source and an electrical load, a controller for rendering the controllably conductive device conductive and non-conductive, and a Wi-Fi module operable to receive the RF signals from the wireless network. The controller controls the controllably conductive device to adjust the power delivered to the load in response to the wireless signals received from the wireless network. The load control device may further comprise an optical module operable to receive an optical signal, such that the controller may obtain an IP address from the received optical signal and control the power delivered to
(Continued)

the load in response to a wireless signal that includes the IP address.

14 Claims, 17 Drawing Sheets

Related U.S. Application Data continuation of application No. 13/538,615, filed on Jun. 29, 2012, now Pat. No. 9,544,977.

(60) Provisional application No. 61/503,292, filed on Jun. 30, 2011.

(56) References Cited

U.S. PATENT DOCUMENTS

| | | | |
|---|---|---|---|
| 4,995,053 | A | 2/1991 | Simpson et al. |
| 5,239,205 | A | 8/1993 | Hoffman et al. |
| 5,340,954 | A | 8/1994 | Hoffman et al. |
| 5,454,077 | A | 9/1995 | Cheron |
| 5,488,571 | A | 1/1996 | Jacobs et al. |
| 5,519,704 | A | 5/1996 | Farinacci et al. |
| 5,602,540 | A | 2/1997 | Spillman |
| 5,627,863 | A | 5/1997 | Aslanis et al. |
| 5,637,930 | A | 6/1997 | Rowen et al. |
| 5,637,964 | A | 6/1997 | Hakkarainen et al. |
| 5,736,965 | A | 4/1998 | Mosebrook et al. |
| 5,812,819 | A | 9/1998 | Rodwin et al. |
| 5,818,128 | A | 10/1998 | Hoffman et al. |
| 5,838,226 | A | 11/1998 | Houggy et al. |
| 5,848,054 | A | 12/1998 | Mosebrook et al. |
| 5,905,442 | A | 5/1999 | Mosebrook et al. |
| 5,982,103 | A | 11/1999 | Mosebrook et al. |
| 6,167,464 | A | 12/2000 | Kretschmann |
| 6,169,377 | B1 | 1/2001 | Bryde et al. |
| 6,300,727 | B1 | 10/2001 | Bryde et al. |
| 6,324,089 | B1 | 11/2001 | Symoen et al. |
| 6,380,696 | B1 | 4/2002 | Sembhi et al. |
| 6,437,692 | B1 | 8/2002 | Petite et al. |
| 6,526,581 | B1 | 2/2003 | Edson |
| 6,545,434 | B2 | 4/2003 | Sembhi et al. |
| 6,687,487 | B1 | 2/2004 | Mosebrook et al. |
| 6,803,728 | B2 | 10/2004 | Balasubramaniam et al. |
| 6,807,463 | B1 | 10/2004 | Cunningham et al. |
| 6,831,569 | B2 | 12/2004 | Wang et al. |
| 6,856,236 | B2 | 2/2005 | Christensen et al. |
| 6,859,644 | B2 | 2/2005 | Wang |
| 6,876,295 | B1 | 4/2005 | Lewis |
| 6,879,806 | B2 | 4/2005 | Shorty |
| 6,891,838 | B1 | 5/2005 | Petite et al. |
| 6,903,650 | B2 | 6/2005 | Murray |
| 6,914,533 | B2 | 7/2005 | Petite |
| 6,914,893 | B2 | 7/2005 | Petite |
| 6,927,547 | B2 | 8/2005 | Walko et al. |
| 6,980,080 | B2 | 12/2005 | Christensen et al. |
| 7,035,270 | B2 | 4/2006 | Moore et al. |
| 7,053,767 | B2 | 5/2006 | Petite et al. |
| 7,085,627 | B2 | 8/2006 | Bamberger et al. |
| 7,089,066 | B2 | 8/2006 | Hesse et al. |
| 7,102,502 | B2 | 9/2006 | Autret |
| 7,103,511 | B2 | 9/2006 | Petite |
| 7,106,261 | B2 | 9/2006 | Nagel et al. |
| 7,126,291 | B2 | 10/2006 | Kruse et al. |
| 7,211,968 | B2 | 5/2007 | Adamson et al. |
| 7,218,998 | B1 | 5/2007 | Neale |
| 7,219,141 | B2 | 5/2007 | Bonasia et al. |
| 7,307,542 | B1 | 12/2007 | Chandler et al. |
| 7,323,991 | B1 | 1/2008 | Eckert et al. |
| 7,345,270 | B1 | 3/2008 | Jones et al. |
| 7,346,016 | B2 | 3/2008 | Nielsen et al. |
| 7,358,927 | B2 | 4/2008 | Luebke et al. |
| 7,362,285 | B2 | 4/2008 | Webb et al. |
| 7,408,525 | B2 | 8/2008 | Webb et al. |
| 7,498,985 | B1 | 3/2009 | Woo et al. |
| 7,525,928 | B2 | 4/2009 | Cutler |
| 7,537,208 | B2 | 5/2009 | Fukusaka et al. |
| 7,548,216 | B2 | 6/2009 | Webb et al. |
| 7,573,436 | B2 | 8/2009 | Webb et al. |
| 7,598,684 | B2 | 10/2009 | Lys et al. |
| 7,687,744 | B2 | 3/2010 | Walter et al. |
| 7,697,492 | B2 | 4/2010 | Petite |
| 7,714,790 | B1 | 5/2010 | Feldstein et al. |
| 7,755,505 | B2 | 7/2010 | Johnson et al. |
| 7,756,086 | B2 | 7/2010 | Petite et al. |
| 7,756,097 | B2 | 7/2010 | Uehara et al. |
| 7,756,556 | B2 | 7/2010 | Patel et al. |
| 7,805,134 | B2 | 9/2010 | Mirza-Baig |
| 7,821,160 | B1 | 10/2010 | Roosli et al. |
| 7,852,765 | B2 | 12/2010 | Neuman et al. |
| 7,853,221 | B2 | 12/2010 | Rodriguez et al. |
| 7,889,051 | B1 | 2/2011 | Billig et al. |
| 8,013,732 | B2 | 9/2011 | Petite et al. |
| 8,031,650 | B2 | 10/2011 | Petite et al. |
| 8,035,255 | B2 | 10/2011 | Kurs et al. |
| 8,146,074 | B2 | 3/2012 | Ito et al. |
| 8,173,920 | B2 | 5/2012 | Altonen et al. |
| 8,228,163 | B2 | 7/2012 | Cash et al. |
| 8,254,838 | B2 | 8/2012 | Feldstein |
| 8,339,247 | B2 | 12/2012 | Adamson et al. |
| 8,364,319 | B2 | 1/2013 | Roosli |
| 8,368,310 | B1 | 2/2013 | Roosli |
| 8,379,564 | B2 | 2/2013 | Petite et al. |
| 8,396,007 | B2 | 3/2013 | Gonia et al. |
| 8,416,074 | B2 | 4/2013 | Sadwick |
| 8,525,372 | B2 | 9/2013 | Huang |
| 8,548,607 | B1 | 10/2013 | Belz et al. |
| 8,598,978 | B2 | 12/2013 | Knode |
| 8,742,686 | B2 | 6/2014 | Zampini et al. |
| 8,792,401 | B2 | 7/2014 | Banks et al. |
| 8,892,261 | B2 | 11/2014 | Hoonhout et al. |
| 9,049,753 | B1 | 6/2015 | Wassel et al. |
| 9,066,381 | B2 | 6/2015 | Valois et al. |
| 9,178,369 | B2 | 11/2015 | Partovi |
| 9,253,857 | B2 | 2/2016 | Van Der Werff |
| 9,288,228 | B2 | 3/2016 | Suumäki |
| 9,368,025 | B2 | 6/2016 | Carmen |
| 9,413,171 | B2 | 8/2016 | Neyhart |
| 9,445,482 | B2 | 9/2016 | Brochu et al. |
| 9,445,485 | B2 | 9/2016 | Reed |
| 9,548,797 | B1 | 1/2017 | Green et al. |
| 9,641,959 | B2 | 5/2017 | Brochu et al. |
| 9,766,645 | B2 | 9/2017 | Imes et al. |
| 9,767,249 | B1 | 9/2017 | Belz et al. |
| 10,019,047 | B2 | 7/2018 | Bull |
| 10,050,444 | B2 | 8/2018 | Neyhart |
| 10,135,629 | B2 | 11/2018 | Browne et al. |
| 10,244,086 | B2 | 3/2019 | Newman et al. |
| 10,271,407 | B2 | 4/2019 | Pessina et al. |
| 10,314,132 | B1 | 6/2019 | Wilde |
| 10,516,546 | B2 | 12/2019 | Browne et al. |
| 10,587,147 | B2 | 3/2020 | Carmen |
| 10,588,204 | B2 | 3/2020 | Pessina et al. |
| 10,693,558 | B2 | 6/2020 | Economy |
| 2001/0024164 | A1 | 9/2001 | Kawamura et al. |
| 2002/0010518 | A1 | 1/2002 | Reid et al. |
| 2002/0043938 | A1 | 4/2002 | Lys |
| 2002/0060530 | A1 | 5/2002 | Sembhi et al. |
| 2002/0073183 | A1 | 6/2002 | Yoon et al. |
| 2002/0087436 | A1 | 7/2002 | Guthrie et al. |
| 2002/0113909 | A1 | 8/2002 | Sherwood |
| 2002/0154025 | A1 | 10/2002 | Ling |
| 2003/0034898 | A1 | 2/2003 | Shamoon et al. |
| 2003/0040813 | A1 | 2/2003 | Gonzales et al. |
| 2003/0109270 | A1 | 6/2003 | Shorty |
| 2003/0151493 | A1 | 8/2003 | Straumann et al. |
| 2003/0197993 | A1 | 10/2003 | Mirowski et al. |
| 2004/0036624 | A1 | 2/2004 | Ballew et al. |
| 2004/0052076 | A1 | 3/2004 | Mueller et al. |
| 2004/0058706 | A1 | 3/2004 | Williamson et al. |
| 2004/0059840 | A1 | 3/2004 | Ware et al. |
| 2004/0193998 | A1 | 9/2004 | Blackburn et al. |
| 2004/0217718 | A1 | 11/2004 | Kumar et al. |
| 2005/0030153 | A1 | 2/2005 | Mullet et al. |

(56) References Cited

U.S. PATENT DOCUMENTS

| | | |
|---|---|---|
| 2005/0045429 A1 | 3/2005 | Baker |
| 2005/0048944 A1 | 3/2005 | Wu |
| 2005/0156708 A1 | 7/2005 | Puranik et al. |
| 2005/0179558 A1 | 8/2005 | Williams et al. |
| 2005/0253538 A1 | 11/2005 | Shah et al. |
| 2005/0285547 A1 | 12/2005 | Piepgras et al. |
| 2006/0027081 A1 | 2/2006 | Chang et al. |
| 2006/0044152 A1 | 3/2006 | Wang |
| 2006/0109203 A1 | 5/2006 | Huber et al. |
| 2006/0154598 A1 | 7/2006 | Rudland et al. |
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1* | 9/2006 | Cash .................... H05B 47/195 340/12.23 |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman |
| 2006/0285150 A1 | 12/2006 | Jung et al. |
| 2007/0051529 A1 | 3/2007 | Soccoli et al. |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walters et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1 | 5/2007 | Wilson et al. |
| 2007/0121323 A1 | 5/2007 | Pawlik et al. |
| 2007/0165997 A1 | 7/2007 | Suzuki et al. |
| 2007/0176788 A1 | 8/2007 | Mor et al. |
| 2007/0229300 A1 | 10/2007 | Masato et al. |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira et al. |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0265799 A1 | 10/2008 | Sibert |
| 2008/0278297 A1 | 11/2008 | Steiner et al. |
| 2008/0284327 A1 | 11/2008 | Kang et al. |
| 2009/0001941 A1 | 1/2009 | Hsu et al. |
| 2009/0026966 A1* | 1/2009 | Budde .................... H05B 47/175 315/152 |
| 2009/0079268 A1 | 3/2009 | Cook et al. |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0227205 A1 | 9/2009 | Rofougaran |
| 2009/0251352 A1 | 10/2009 | Altonen et al. |
| 2009/0302782 A1 | 12/2009 | Smith et al. |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1 | 2/2010 | Wan et al. |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1 | 4/2010 | Yun et al. |
| 2010/0114242 A1 | 5/2010 | Doerr et al. |
| 2010/0127821 A1 | 5/2010 | Jones et al. |
| 2010/0134341 A1 | 6/2010 | Priest |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes et al. |
| 2010/0238001 A1 | 9/2010 | Veskovic |
| 2010/0238003 A1 | 9/2010 | Chan et al. |
| 2010/0244706 A1 | 9/2010 | Steiner et al. |
| 2010/0262296 A1 | 10/2010 | Davis et al. |
| 2010/0289430 A1 | 11/2010 | Stelzer et al. |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0039137 A1 | 2/2011 | Knobloch et al. |
| 2011/0043163 A1 | 2/2011 | Baarman |
| 2011/0046792 A1 | 2/2011 | Imes et al. |
| 2011/0078411 A1 | 3/2011 | MacLinovsky et al. |
| 2011/0095622 A1 | 4/2011 | Feldstein et al. |
| 2011/0101869 A1* | 5/2011 | Pope .................... H05B 41/295 315/132 |
| 2011/0113475 A1 | 5/2011 | Garcia Morchon |
| 2011/0121654 A1 | 5/2011 | Recker et al. |
| 2011/0202910 A1 | 8/2011 | Venkatakrishnan et al. |
| 2011/0208369 A1 | 8/2011 | Yang et al. |
| 2011/0244798 A1 | 10/2011 | Daigle et al. |
| 2011/0244897 A1 | 10/2011 | Shibuya |
| 2011/0282468 A1 | 11/2011 | Ashdown |
| 2011/0282495 A1 | 11/2011 | Fischer et al. |
| 2011/0305200 A1 | 12/2011 | Schoofs et al. |
| 2012/0018578 A1 | 1/2012 | Polcuch |
| 2012/0039400 A1 | 2/2012 | Rieken |
| 2012/0086561 A1 | 4/2012 | Ilyes et al. |
| 2012/0086562 A1 | 4/2012 | Steinberg |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0108230 A1 | 5/2012 | Stepanian |
| 2012/0158203 A1 | 6/2012 | Feldstein |
| 2012/0163663 A1 | 6/2012 | Masoud et al. |
| 2012/0175969 A1 | 7/2012 | Maughan et al. |
| 2012/0235504 A1 | 9/2012 | Kesler et al. |
| 2012/0235579 A1 | 9/2012 | Chemel et al. |
| 2012/0239963 A1 | 9/2012 | Smith |
| 2012/0250831 A1 | 10/2012 | Gorecki, Jr. |
| 2012/0254961 A1 | 10/2012 | Kim et al. |
| 2012/0257543 A1 | 10/2012 | Baum et al. |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1 | 12/2012 | Lee |
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1 | 1/2013 | Economy et al. |
| 2013/0030589 A1 | 1/2013 | Pessina et al. |
| 2013/0051375 A1 | 2/2013 | Chemishkian et al. |
| 2013/0063042 A1 | 3/2013 | Bora et al. |
| 2013/0073431 A1 | 3/2013 | Suro et al. |
| 2013/0100855 A1 | 4/2013 | Jung et al. |
| 2013/0134783 A1 | 5/2013 | Mohammediyan et al. |
| 2013/0187563 A1 | 7/2013 | Sasai et al. |
| 2013/0211844 A1 | 8/2013 | Sadwick |
| 2013/0223279 A1 | 8/2013 | Tinnakornsrisuphap et al. |
| 2013/0261821 A1 | 10/2013 | Lu et al. |
| 2013/0286889 A1 | 10/2013 | Cherian et al. |
| 2013/0322281 A1 | 12/2013 | Ludlow et al. |
| 2014/0070919 A1 | 3/2014 | Jackson et al. |
| 2014/0106735 A1 | 4/2014 | Jackson et al. |
| 2014/0163742 A1 | 6/2014 | Element |
| 2014/0163751 A1 | 6/2014 | Davis et al. |
| 2014/0175875 A1 | 6/2014 | Newman et al. |
| 2014/0177469 A1 | 6/2014 | Neyhart et al. |
| 2014/0180487 A1 | 6/2014 | Bull et al. |
| 2014/0277805 A1 | 9/2014 | Browne et al. |
| 2014/0289825 A1 | 9/2014 | Chan et al. |
| 2014/0304773 A1 | 10/2014 | Woods et al. |
| 2014/0375421 A1 | 12/2014 | Morrison et al. |
| 2014/0375428 A1 | 12/2014 | Park |
| 2015/0017973 A1 | 1/2015 | Gold |
| 2015/0097666 A1 | 4/2015 | Boyd et al. |

(56) References Cited

U.S. PATENT DOCUMENTS

| | | |
|---|---|---|
| 2015/0200925 A1 | 7/2015 | Lagerstedt et al. |
| 2015/0239353 A1 | 8/2015 | Cregut |
| 2015/0259078 A1 | 9/2015 | Filipovic et al. |
| 2015/0342011 A1 | 11/2015 | Brochu et al. |
| 2016/0119032 A1 | 4/2016 | Choi et al. |
| 2016/0148449 A1 | 5/2016 | God et al. |
| 2016/0149411 A1 | 5/2016 | Neyhart |
| 2016/0254699 A1 | 9/2016 | Carmen |
| 2016/0285550 A1 | 9/2016 | Economy |
| 2017/0064798 A1 | 3/2017 | Economy et al. |
| 2017/0264452 A1 | 9/2017 | Vollmer et al. |
| 2018/0168019 A1 | 6/2018 | Baker et al. |
| 2018/0198893 A1 | 7/2018 | Newman et al. |
| 2018/0205460 A1 | 7/2018 | Economy |
| 2018/0321722 A1 | 11/2018 | Bull |
| 2018/0324933 A1 | 11/2018 | Hammett et al. |
| 2019/0006846 A1 | 1/2019 | Neyhart |
| 2020/0092003 A1 | 3/2020 | Economy |
| 2020/0195460 A1 | 6/2020 | Browne et al. |

FOREIGN PATENT DOCUMENTS

| | | | |
|---|---|---|---|
| DE | 102006046489 A1 | 4/2008 | |
| DE | 102009056152 A1 | 6/2011 | |
| EP | 0767551 B1 | 8/2002 | |
| EP | 1727399 A2 | 11/2006 | |
| EP | 1693991 B1 | 7/2009 | |
| GB | 2533675 A | 6/2016 | |
| JP | 2011023819 A | 2/2011 | |
| WO | 1999046921 A2 | 9/1999 | |
| WO | 2001052515 A1 | 7/2001 | |
| WO | 2001074045 A1 | 10/2001 | |
| WO | 2002071689 A2 | 9/2002 | |
| WO | 2001052515 A9 | 10/2002 | |
| WO | 2002071689 A3 | 11/2002 | |
| WO | 2003007665 A1 | 1/2003 | |
| WO | 2004023849 A1 | 3/2004 | |
| WO | 2004056157 A1 | 7/2004 | |
| WO | 2006133172 A2 | 12/2006 | |
| WO | 2007069129 A2 | 6/2007 | |
| WO | 2008040454 A2 | 4/2008 | |
| WO | 2008092082 A2 | 7/2008 | |
| WO | 2008095250 A1 | 8/2008 | |
| WO | 2009010916 A2 | 1/2009 | |
| WO | 2010027412 A1 | 3/2010 | |
| WO | 2010143130 A1 | 12/2010 | |
| WO | 2011064244 A2 | 6/2011 | |
| WO | 2018099793 A1 | 6/2018 | |

OTHER PUBLICATIONS

U.S. Appl. No. 16/102,357, filed Aug. 13, 2018.
U.S. Appl. No. 16/113,548, filed Aug. 27, 2018.
U.S. Appl. No. 16/813,022, filed Mar. 9, 2020.
U.S. Appl. No. 16/813,148, filed Mar. 9, 2020.
International Patent Application No. PCT/US2012/045114, International Search Report dated Oct. 24, 2012, 5 pages.
International Patent Application No. PCT/US2012/045067, International Search Report dated Oct. 29, 2012, 6 pages.
International Patent Application No. PCT/US2012/045096, International Search Report dated Apr. 2, 2013, 8 pages.
"CEDIA 2012: Crestron Demos Home Technology Control Solution with NFC-Enabled Mobile Device", Available at http://www.youtube.com/watch?v=qXwoTJX14BE, retrieved on Aug. 13, 2013, Video Provided on CD Media, Sep. 8, 2012, pp. 1-2.
"Crestron NFC Demo at CEDIA Expo 2012", Available at http://www.youtube.com/watch?v=FQ1f5vxwqnl, Retrieved on Aug. 13, 2013, Transcript of Video provided on CD media, Sep. 10, 2012, pp. 1-2.
"SimpleLink™ CC3000 Boosterpack Jump-Starts the Internet of Things", Available at http://www.youtube.com/watch?v=6kh0g0KMIQc, retrieved on Aug. 13, 2013, Transcript of Video provided on CD Media, Jun. 6, 2013, 1 page.
Gade, Lisa, "PalmOne Treo 600 Palm OS Smartphone from Sprint PCS", Mobile Tech Review, Document Available at http://www.mobiletechreview.com/treo_600.htm, retrieved on May 21, 2013, Oct. 28, 2003, 4 pages.
Gade, Lisa, "PalmOne Treo 650 Palm OS Smartphone:CDMA (Sprint) and GSM Versions", Mobile Tech Review, Document Available at: http://web.archive.org/web/20050404004524/http://www.mobiletechreview.com/Treo_650.htm, Retrieved on May 21, 2013, Dec. 10, 2004, 6 pages.
JS JS Designs PLC, "JS JS Products", Available at http://web.archive.org/web/20101111085355/http://www.jsjsdesigns.com/product.html, Nov. 11, 2010, 4 pages.
Myers, Dana, "SimpleLink™ Wi-Fi® CC3000-First Time Config Using PC", Available at http://youtube.com/watch?v=10U4NTgkjLs, retrieved on Aug. 13, 2013, Transcript of Video provided on CD Media, Dec. 18, 2012, pp. 1-2.
Myers, Dana, "SimpleLink™ Wi-Fi® CC3000-First Time Config with Smartphone", Available at http://www.youtube.com/watch?v=fxP9hnZysgo, retrieved on Aug. 13, 2013, Transcript of Video provided on CD Media, Sep. 19, 2012, pp. 1-2.
Rusty Brick, Inc., "iPhone 4 Morse Code Transmission App", Available at http://www.rustybrick.com/ipone-morse-code.php, Jan. 4, 2011, 3 pages.
Texas Instruments, "CC3000 Smart Config", Available at http://processors.wiki.ti.com/index.php/CC3000/Smart_Config, retrieved on Sep. 26, 2013, Mar. 28, 2013, pp. 1-6.
DE 102006046489 A1, Cited in Search Report dated Oct. 24, 2012, issued in related PCT Application No. PCT/US2012/045114.
WO 2008/040454 A2, Cited in Information Disclosure Statement filed on Dec. 5, 2013, in related U.S. Appl. No. 13/538,555.
CN 101789978 A, Cited in Search Report dated Oct. 29, 2012, issued in related PCT Application No. PCT/US2012/045067.
JP 2011-023819 A, Cited in Search Report dated Apr. 2, 2013, issued in related PCT Application No. PCT/US2012/045096.
Black Rich "Clear Connect RF Technology" Lutron Electronics Company Inc. Aug. 2009 16 pages.

* cited by examiner

METHOD OF PROGRAMMING A LOAD CONTROL DEVICE

CROSS-REFERENCE TO RELATED APPLICATIONS

This application is a continuation of U.S. Non-Provisional patent application Ser. No. 15/352,673, filed on Nov. 16, 2016, now U.S. Pat. No. 10,779,381, issued Sep. 15, 2020 which is a continuation of U.S. Non-Provisional patent application Ser. No. 13/538,615, filed on Jun. 29, 2012, now U.S. Pat. No. 9,544,977, issued Jan. 10, 2017, which claims the benefit of U.S. Provisional Patent Application No. 61/503,292, filed on Jun. 30, 2011, each of which is hereby incorporated by reference herein in its entirety.

This application is related to commonly assigned U.S. patent application Ser. No. 13/538,555, filed Jun. 29, 2012, entitled LOAD CONTROL DEVICE HAVING INTERNET CONNECTIVITY; and to commonly assigned U.S. patent application Ser. No. 13/538,665, filed Jun. 29, 2012, entitled METHOD OF OPTICALLY TRANSMITTING DIGITAL INFORMATION FROM A SMART PHONE TO A CONTROL DEVICE, the contents of each are hereby incorporated by reference herein in its entirety.

BACKGROUND OF THE INVENTION

Field of the Invention

The present invention relates to a load control device for controlling the amount of power delivered to an electrical load, and more particularly, to a wall-mounted dimmer switch that is operable to connect to the Internet via a wireless connection and to control a lighting load in response to messages received via the Internet.

Description of the Related Art

A load control device may be adapted to be coupled in a series electrical connection between an alternating-current (AC) power source and an electrical load for control of the power delivered from the AC power source to the electrical load. Prior art load control devices include, for example, lighting control devices (such as wall-mounted dimmer switches and plug-in lamp dimmers), motor control devices (for motor loads), temperature control devices, motorized window treatments, and remote controls. Some load control devices are operable to transmit and receive wireless signals, such as radio-frequency (RF) or infrared (IR) signals, to thus provide for wireless control of the corresponding loads. One example of an RF lighting control system is disclosed in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

There is a need for a wireless load control device that is operable to connect to the Internet via a wireless connection and to control or program a lighting load in response to messages received from a wireless device (e.g., received via the Internet). It would be particularly desirable if such load control device were operable to be controlled or programmed from a Wi-Fi enabled control device, such as a smart phone (for example, an iPhone® or Android® smart phone).

SUMMARY OF THE INVENTION

According to an embodiment of the present invention, a load control device may be implemented to control power delivered from an AC power source to an electrical load. The load control device may include a controllably conductive device, a controller, and a near-field communications (NFC) module. The controllably conductive device may be adapted to be coupled in series electrical connection between the source and the load. The controller may be operatively coupled to a control input of the controllably conductive device for rendering the controllably conductive device conductive and non-conductive. The NFC module may be operatively coupled to the controller. The NFC may be operable to receive at least one NFC signal for programming operating parameters of the load control device. The controller may be operable to control the controllably conductive device to control the power delivered to the load based on the operating parameters of the load control device.

According to an embodiment of the present invention, the load control device may include a controllably conductive device, a controller, and an Internet Protocol communications module. The controllably conductive device may be adapted to be coupled in series electrical connection between the source and the load. The controller may be operatively coupled to the controllably conductive device for controlling the controllably conductive device. The Internet Protocol communications module may be operatively coupled to the controller. The Internet Protocol communications module may be operable to receive an Internet Protocol packet for programming the load control device. The controller may be operable to control the controllably conductive device based on the programming of the load control device.

According to an embodiment of the present invention, the load control device may include a controllably conductive device, a controller, and an optical module. The controllably conductive device may be adapted to be coupled in series electrical connection between the source and the load. The controller may be operatively coupled to a control input of the controllably conductive device for rendering the controllably conductive device conductive and non-conductive. The optical module may be operatively coupled to the controller. The optical module may be operable to receive an optical signal for programming operating parameters of the load control device. The controller may be operable to control the controllably conductive device to control the power delivered to the load based on the optical signal programming of the load control device.

According to an embodiment of the present invention, a load control system is described for controlling power delivered from an AC power source to an electrical load. The load control system may include a load control device and a smart phone. The load control device may be adapted to be coupled in series electrical connection between the source and the load for controlling the power delivered to the load. The load control device may store one or more operating parameters. The smart phone may include a visual display for providing a user interface for adjusting the one or more operating parameters of the load control device. The smart phone may be operable to directly transmit operating parameters to the load control device.

According to an embodiment of the present invention, a lighting control device may be programmed using a wireless control device. The wireless control device may include a visual display and/or a camera. The lighting control device may be operable to adjust the intensity of a lighting load.

The lighting load may be purchased in packaging having a barcode. The barcode of the packaging of the lighting load may be scanned using the camera of the wireless control device. The wireless control device may determine an operating parameter for the lighting load using information received from the scanned barcode. A digital message may be transmitted that includes the operating parameter to the lighting control device. The operating parameter may be stored in the lighting control device in response to the lighting control device receiving the digital message.

According to an embodiment of the present invention, the lighting control device may be operable to adjust the intensity of a lighting load by transmitting a first digital message from a wireless control device when the camera of the wireless control device is directed at the lighting load. The intensity of the lighting load may be adjusted to a first intensity in response to the lighting control device receiving the first digital message. The intensity of the lighting load may be decreased from the first intensity while the camera of the wireless control device is directed at the lighting load. A second digital message may be transmitted from the wireless control device to the lighting control device when the wireless control device detects flickering of the intensity of the lighting load. The intensity of the lighting load may be increased in response to the lighting control device receiving the second digital message. A third digital message may be transmitted from the wireless control device to the lighting control device when the wireless control device does not detecting flickering in the intensity of the lighting control device. The adjustment of the intensity of the lighting load may be ceased in response to the lighting control device receiving the third digital message, such that the intensity of the lighting load is at a second intensity. The second intensity may be stored as a low-end intensity of the lighting control device.

BRIEF DESCRIPTION OF THE DRAWINGS

The invention will now be described in greater detail in the following detailed description with reference to the drawings in which.

DETAILED DESCRIPTION OF THE INVENTION

Figure 1:
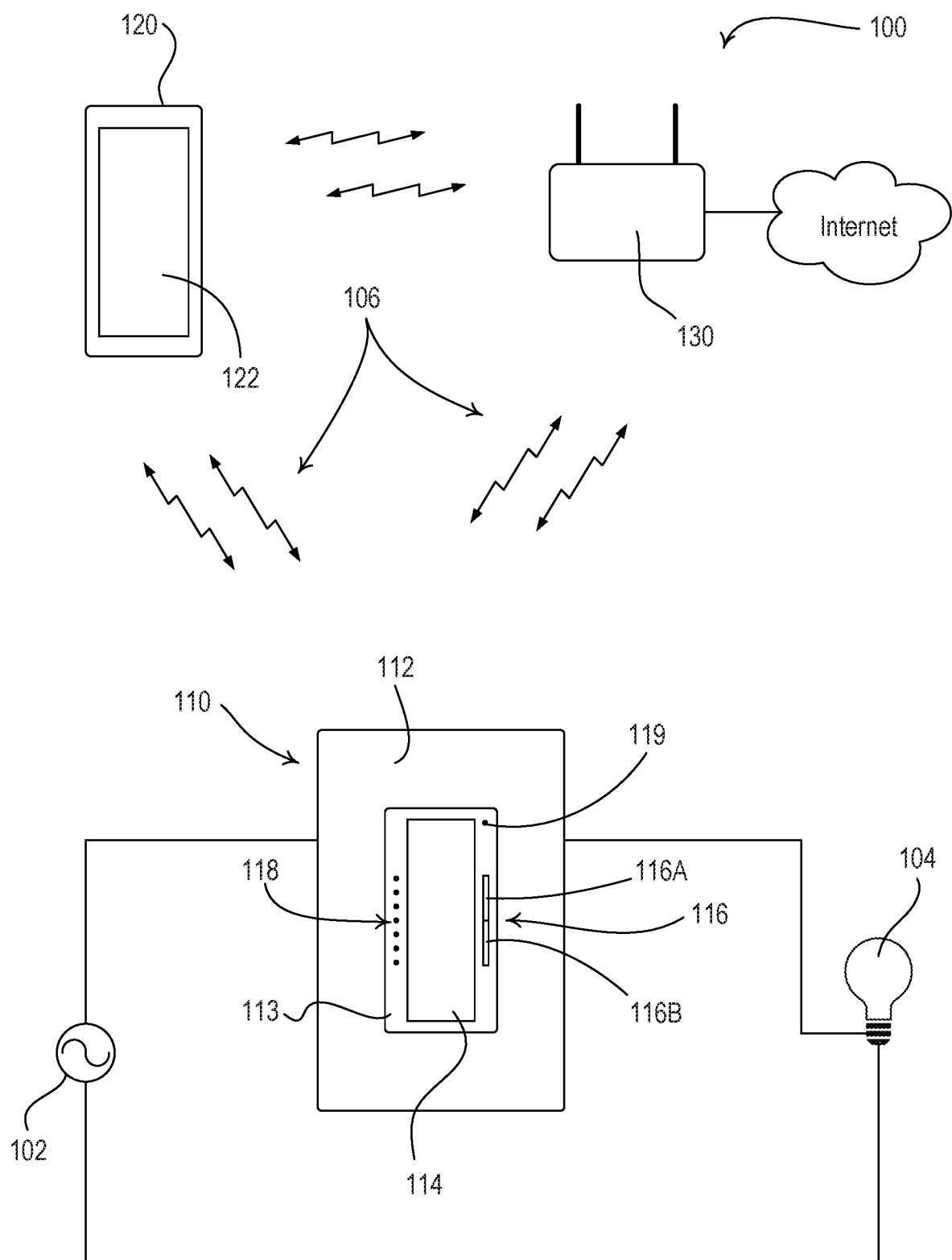
FIG. 1 is a simple diagram of a radio-frequency (RF) lighting control system comprising a dimmer switch and a wireless control device, such as a smart phone, according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 that includes a dimmer switch 110 and a wireless control device 120, according to an example embodiment of the present invention. The wireless control device 120 may be any device capable of performing wireless communications, such as, a smart phone (for example, an iPhone® smart phone, an Android® smart phone, or a Blackberry® smart phone), a personal computer, a laptop, a wireless-capable media device (e.g., MP3 player, gaming device, or television), or a tablet device, (for example, an iPad® hand-held computing device), a Wi-Fi or wireless-communication-capable television, or any other suitable Internet-Protocol-enabled device.

According to an embodiment of the present invention, the wireless control device 120 may be operable to transmit digital messages in one or more Internet Protocol packets to the dimmer switch 110. The Internet Protocol (IP) is responsible for addressing and routing datagrams (i.e., packets) from a source host to a destination host across one or more IP networks. For this purpose, the Internet Protocol defines an addressing system that has two functions: identifying hosts and providing a logical location service. This is accomplished by defining standard datagrams and a standard addressing system.

Each datagram has two components, a header and a payload. The IP header is tagged with the source IP address, destination IP address, and other meta-data needed to route and deliver the datagram. The payload is the data to be transported.

The wireless control device 120 may transmit the digital messages via RF signals 106 either directly or via a wireless network that includes a standard wireless router 130. For example, the wireless control device 120 may transmit the RF signals 106 directly to the dimmer switch 110 via a point-to-point communication, such as a Wi-Fi communication link, e.g., an 802.11 wireless local area network (LAN), or other direct wireless communication link, e.g., a Wi-MAX communication link or a Bluetooth® communication link. This point-to-point communication may be performed using a standardized communication, e.g., Wi-Fi Direct, or any non-standardized communication that allows a wireless device to connect to another wireless device without the use of a wireless access point. For example, the wireless control device 120 and/or the dimmer switch 110 may download a software access point (AP) that provides a protected wireless communication between the devices.

The wireless control device 120 may also transmit RF signals 106 to the dimmer switch 110 via a wireless network. The wireless network may enable wireless communications via one or more wireless communications links, such as a Wi-Fi communications link, a Wi-MAX communications link, a Bluetooth® communications link, a cellular communications link, a television white space (TVWS) communication link, or any combination thereof. For example, the wireless control device 120 may communicate with a network server via a first wireless communications link (e.g., a cellular communications link), while the dimmer switch 110 communicates with the network server via a second communications link (e.g., a Wi-Fi communications link). In an alternative embodiment, the wireless control device 120 and the dimmer switch 110 may communicate with the network via the same type of communication link. The lighting control system 100 may also include a femtocell, a Home Node B, and/or other network entity for facilitating the configuration and operation of the lighting control system and for allowing wireless communications and connection to the Internet.

The dimmer switch 110 may be coupled in series electrical connection between an AC power source 102 and a lighting load 104 for controlling the amount of power delivered to the lighting load. The dimmer switch 110 may be wall-mounted in a standard electrical wallbox, or alternatively implemented as a table-top load control device. The dimmer switch 110 comprises a faceplate 112 and a bezel 113 received in an opening of the faceplate. The dimmer switch 110 further comprises a toggle actuator 114 and an intensity adjustment actuator 116. Actuations of the toggle actuator 114 toggle, e.g., alternatingly turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity of the lighting load 104 from a minimum (i.e., low-end) intensity (e.g., approximately 1-10%) to a maximum (i.e., high-end) intensity (e.g., approximately 100%). A plurality of visual indicators 118, e.g., light-emitting diodes (LEDs), may be arranged in a linear array on the left side of the bezel 113. The visual indicators 118 are illuminated to provide visual feedback of the intensity of the lighting load 104. An example of a dimmer switch having a toggle actuator and an intensity adjustment actuator is described in greater detail in U.S. Pat. No. 5,248,919 ("the 919 patent"), issued Sep. 28, 1993, entitled LIGHTING CONTROL DEVICE, the entire disclosure of which is hereby incorporated by reference. Alternatively, the dimmer switch 110 could be replaced by an electronic switch for simply turning the lighting load 104 on and off. The electronic switch may include a single visual indicator, e.g., the middle indicator of the visual indicators 118 of the dimmer switch 110.

According to an example embodiment of the present invention, the dimmer switch 110 may include an optical receiver 119. The optical receiver 119 may be used to receive optical signals from the wireless control device 120. Optical signals may be free-space optical communications or communications via physical connections. For example, free space optical communications may include communications via air, while physical optical communications may include communications via optical fiber cable or an optical transmission pipe. The optical signals may also be included in visible light, e.g., a flashing light, or non-visible light, e.g., infrared, spectrums.

The optical signals may provide instructions for programming and/or adjusting the operating parameters (e.g., the low-end intensity and the high-end intensity) of the dimmer switch 110. For example, the optical signals may be used to configure the dimmer switch such that the dimmer switch 110 is operable to receive the RF signals 106 from the wireless control device 120 as will be described in greater detail below. The optical signals may also be used to control or program the lighting configurations of the dimmer switch 110. And, though embodiments described herein may be described with respect to using optical signals or other signals to program or control a dimmer switch from a wireless control device, such signals may be used to program or control any device that is capable of receiving instructions via such optical or other signals, such as shades, thermostats, plug-in devices, or the like.

Wireless load control devices are described in greater detail in commonly-assigned U.S. Pat. No. 5,838,226, issued Nov. 17, 1998, entitled COMMUNICATION PROTOCOL FOR TRANSMISSION SYSTEM FOR CONTROLLING AND DETERMINING THE STATUS OF ELECTRICAL DEVICES FROM REMOTE LOCATIONS; U.S. Pat. No. 6,803,728, issued Oct. 12, 2004, entitled SYSTEM FOR CONTROL OF DEVICES; U.S. patent application Ser. No. 12/033,223, filed Feb. 19, 2008, entitled COMMUNICATION PROTOCOL FOR A RADIO-FREQUENCY LOAD CONTROL SYSTEM; and U.S. patent application Ser. No. 13/234,573, filed Sep. 16, 2011, entitled DYNAMIC KEYPAD FOR CONTROLLING ENERGY-SAVINGS SETTINGS OF A LOAD CONTROL SYSTEM; the entire disclosures of which are hereby incorporated by reference.

The wireless control device 120 has a visual display 122, which may comprise a touch screen having, for example, a capacitive touch pad displaced overtop the visual display, such that the visual display may display soft buttons that may be actuated by a user. Alternatively, the wireless control device 120 may comprise a plurality of hard buttons (e.g., physical buttons) in addition to the visual display 122. The wireless control device 120 may download a product control application for allowing the user to control the lighting load 104. In response to actuations of the displayed soft buttons or hard buttons, the wireless control device 120 transmits digital messages to the dimmer switch 110 directly or through other wireless communications described herein. For example, the digital messages may be transmitted via Wi-Fi communication using the wireless router 130. The dimmer switch 110 may adjust the intensity of the lighting load 104 in response to commands included in the digital messages, such that the dimmer switch controls the lighting load in response to actuations of the soft buttons or hard buttons of the wireless control device 120.

In addition, the wireless control device 120 may be controlled to transmit optical signals, near field communication (NFC) signals, or RF signals according to a proprietary RF communication protocol (such as, for example, the Clear Connect™ protocol) as described herein. For example, the visual display 122 may be controlled to transmit optical signals to the optical receiver 119 of the dimmer switch 110 (as will be described in greater detail below). The wireless control device 120 may also comprise a camera lens 124 (FIG. 6) and a camera flash lighting source 126 (FIG. 6), which may also be used to transmit and receive optical signals for controlling the lighting load.

The dimmer switch 110 and the wireless control device 120 may both be assigned a unique address for wireless communications described herein. For example, where wireless communications are performed using a Wi-Fi communication link, a Media Access Control (MAC) address may be assigned (e.g., during manufacture). The wireless control device 120 may connect to the wireless LAN via the wireless router 130 using standard procedures. The wireless control device 120 is assigned an Internet Protocol (IP) address upon connecting to the wireless LAN. The wireless control device 120 may store the service set identifier (SSID) and the SSID password of the wireless LAN. After obtaining the IP address, the wireless control device 120 is able to assign an IP address (e.g., different from the IP address of the wireless control device 120) to the dimmer switch 110. Alternatively, the dimmer switch 110 may be operable to obtain the IP address from the wireless router 130 using, for example, procedures defined by the Wi-Fi Protected Setup standard.

The dimmer switch 110 may be associated with (e.g., assigned to) the wireless control device 120, such that the wireless control device may transmit commands for controlling the intensity of the lighting load 104 or programming the dimmer switch 110. Such commands may be transmitted to the dimmer switch 110 via the RF signals 106. Digital messages transmitted to and from the dimmer switch 110 may include, for example, the MAC address and the IP address of the dimmer switch 110. The dimmer switch 110 is operable to turn the lighting load 104 on and off. The dimmer switch 110 is also operable to adjust the intensity of the lighting load in response to received digital messages, including the MAC address and the IP address of the dimmer switch, for example. In addition, the wireless router 130 may be operable to receive commands for controlling the lighting load 104 from the Internet, and may wirelessly transmit corresponding digital messages to the dimmer switch 110.

According to an example embodiment, the dimmer switch 110 may be assigned an IP address, an SSID, an SSID password, and/or a software AP at manufacture, such that the dimmer switch 110 may act as an AP for other communication devices in a LAN. The wireless control device 120 may recognize the dimmer switch 110 as an AP and may connect to the LAN via the dimmer switch 110. For example, the dimmer switch 110 may connect to router 130 or may perform the functions of the router 130 itself.

The dimmer switch 110 may also connect to the wireless LAN to discover other dimmer switches (not shown). The dimmer switch 110 may discover the other dimmer switches using any discovery protocol, such as Bonjour, Simple Service Discovery Protocol (SSDP), Bluetooth® Service Discovery Protocol (SDP), DNS service discovery (DNS-SD), Dynamic Host Configuration Protocol (DHCP), Internet Storage Name Service (iSNS), Jini for Java objects, Service Location Protocol (SLP), Session Announcement Protocol (SAP) for RTP sessions, Simple Service Discovery Protocol (SSDP) for Universal Plug and Play (UPnP), Universal Description Discovery and Integration (UDDI) for web services, Web Proxy Autodiscovery protocol (WPAD), Web Services Dynamic Discovery (WS-Discovery), XMPP Service Discovery (XEP-0030), and/or XRDS for XRI, OpenID, OAuth, etc. Upon the dimmer switch 110 discovering one or more other dimmer switches, the dimmer switch may create a peer-to-peer network of dimmer switches capable of communicating with one another. For example, the dimmer switches may communicate programming and/or control instructions received from the wireless control device 120.

The wireless control device 120 may control the lighting load 104 by communicating instructions to the dimmer switch 110 via the RF signals 106 that cause the dimmer switch 110 to execute control instructions that have been pre-programmed on the dimmer switch 110. For example, the dimmer switch 110 may be pre-programmed at manufacture or via an update to execute the control instructions. The control instructions may include pre-configured settings (e.g., protected or locked lighting presets), instructions for raising/lowering lighting level, instructions for fading, instructions for scheduling, instructions for turning lights on/off, or any other pre-programmed instruction, for example.

The wireless control device 120 may also program the settings (i.e., the operating parameters) of the dimmer switch 110 (e.g., when the dimmer switch is in programming mode). For example, the dimmer switch 110 may be a dimmer switch that may have a limited user interface (UI) or may not have any user interface. As such, the user interface of the wireless control device 120 may be used to program the dimmer switch 110. For example, various wireless communication links described herein, e.g., Wi-Fi signals, optical signals, near field communication (NFC) signals, or proprietary-protocol RF signals, may be used to program any of a number of programmable features provided by the dimmer switch 110. Such features may be selected via the wireless control device 120. For example, the wireless control device 120 may program the dimmer switch 110 with such features as protected or locked presets, high-end trim, low-end trim, adjustable delay, fade time, load type, performing communications via wireless communication modes (e.g., as described herein), or being compatible with different lamps. In addition, the wireless control device 120 may be operable to program the dimmer switch 110 to change between modes of operation, for example, between a switching mode, a dimming mode, and/or an electronic timer mode (i.e., a countdown timer mode). The programming signal may be a one-way or two-way serial communication with the dimmer switch 110.

A protected preset is a feature that allows the user to lock the present light intensity level as a protected preset lighting intensity to which the dimmer may set the lighting load 104. For example, when the dimmer switch 110 is turned on while a protected preset is disabled, the dimmer may set the lighting load 104 to the intensity level at which the dimmer was set when the lighting load was last turned off. When the dimmer switch 110 is turned on while protected preset is enabled, the dimmer may set the lighting load 104 to the protected preset intensity level, for example. The protected preset value may be user-programmed. For example, the user may select a value from among a plurality of allowable values for the protected preset light intensity level. When the lighting load 104 is turned on with protected preset enabled, a processor or controller may access a memory in the dimmer switch 110 to retrieve the user-selected value, and cause the lighting load 104 to be set to the intensity level represented by that value.

High-end trim (i.e., high-end intensity) is a feature that governs the maximum intensity level to which the lighting load 104 may be set by the dimmer switch 110. Values for the high-end trim may range between about 60% and about 100% of full intensity, for example. In an example embodiment, the high-end trim may be pre-programmed to be about 90% of full intensity. In a dimmer switch 110, high-end trim is a feature that may be user-programmed as described herein.

Similarly, low-end trim (i.e., low-end intensity) is a feature that governs the minimum intensity level to which the lighting load 104 may be set by the dimmer switch 110. Values for the low-end trim may range between about 1% and about 20% of full intensity, for example. In an example embodiment, the low-end trim may be preprogrammed to be about 10% of full intensity. In a dimmer switch 110, low-end trim is a feature that may be user-programmed as described herein.

Delay-to-off is a feature that causes the lighting load 104 to remain at a certain intensity level for a prescribed period of time before fading to off. Such a feature may be desirable in certain situations, such as, for example, when a user wishes to turn out bedroom lights before retiring, but still have sufficient light to make his way safely to bed from the location of the dimmer switch 110 before the lights are completely extinguished. Similarly, the night staff of a large building may wish to extinguish ambient lights from a location that is some distance away from an exit, and may wish to delay the fade to off for a period of time sufficient for them to walk safely to the exit. Delay-to-off times may range from about 10 seconds to about 60 seconds for example. The delay-to-off time may be user-programmed, as described herein. For example, the user may select a value from among a plurality of allowable values for the delay-to-off time. When the lighting load is turned off with the delay-to-off feature enabled, the dimmer switch 110 may access the user-selected value of delay-to-off feature from memory. The lighting load 104 may remain at the current intensity level for a time represented by the user-selected value of delay-to-off feature.

Fading is a feature whereby the dimmer causes the lighting load 104 to change from one intensity level to another at a certain rate or plurality of successive rates based on different closures of the toggle switch or indicated in the instructions received from the wireless control device 120 and depending on the state of lighting load 104. Examples of fading are described in greater detail in the 919 patent. U.S. Pat. No. 7,071,634, issued Jul. 4, 2006, entitled LIGHTING CONTROL DEVICE HAVING IMPROVED LONG FADE OFF, discloses a lighting control device that is capable of activating a long fade off from any light intensity and is incorporated herein by reference. Any or all of the features that define the fade features may be user-programmed via the wireless control device 120.

Another feature that may be programmed as described herein is load type. The load type may be inductive, resistive, or capacitive. Forward phase-controlled dimming may be desirable where the load is inductive or resistive; reverse phase-controlled dimming may be desirable where the load is capacitive. Thus, the load type may be defined, at least in part, by a feature having a value associated with either forward phase control or reverse phase control.

In addition, the dimmer switch 110 may comprise an occupancy sensor or may be responsive to a remote occupancy sensor, and may store operating parameters, such as an occupancy sensor sensitivity setting or timeout value that may be programmed by the wireless control device 120. The wireless control device 120 may also be operable to program the dimmer switch 110 to operate in one of an occupancy mode and a vacancy mode. In the occupancy mode, the dimmer switch 110 operates to turn a controlled lighting load on and off in response to the occupancy sensor. In the vacancy mode, the dimmer switch 110 operates to only turn the lighting load off in response to the occupancy sensor. Examples of occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 30, 2011, entitled RADIO-FREQUENCY LIGHTING CONTROL SYSTEM WITH OCCUPANCY SENSING; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

Figure 2:
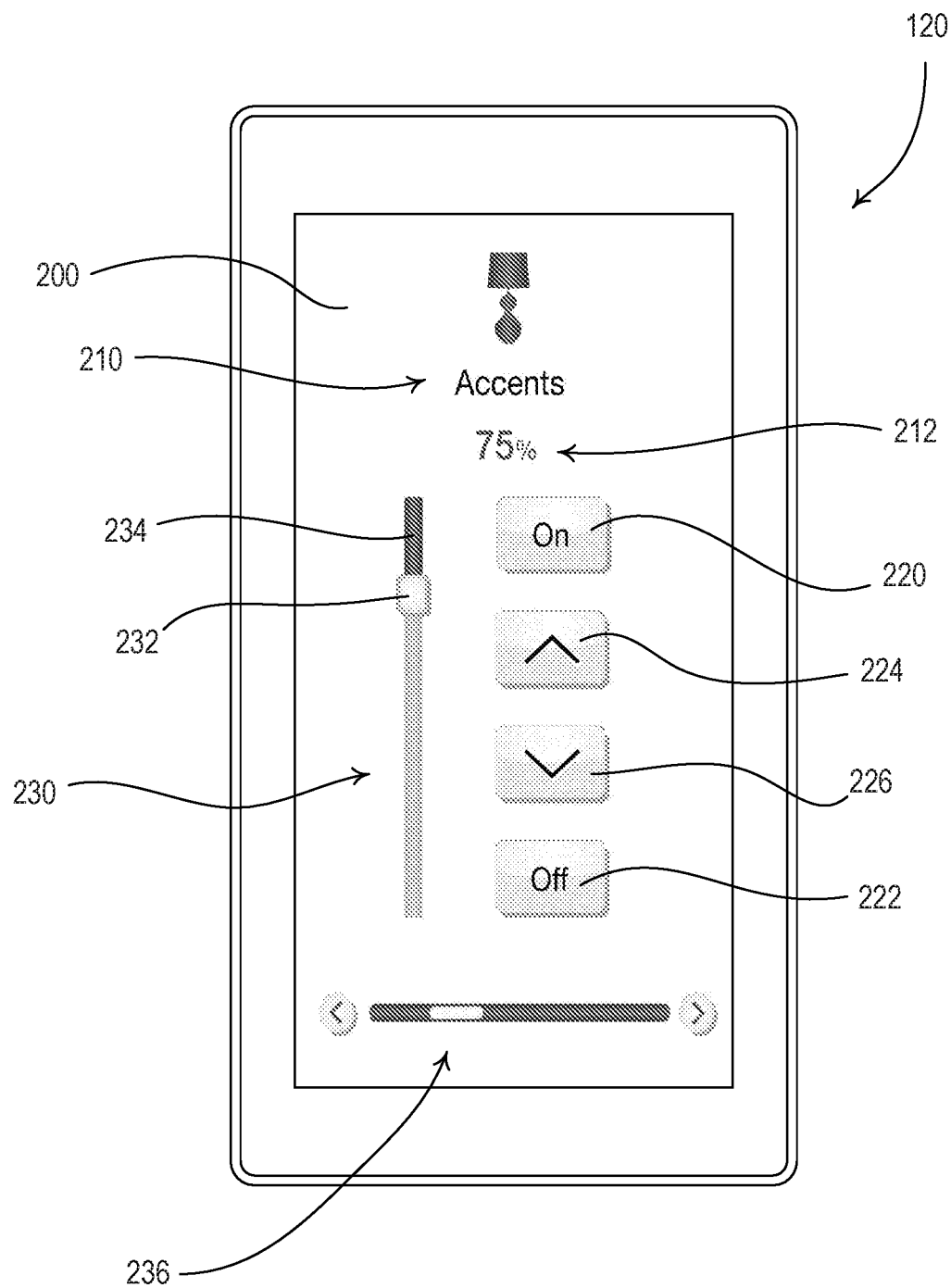
FIG. 2 is an example screenshot that may be provided on the wireless control device for controlling the dimmer switch of the RF lighting control system of FIG. 1.

FIG. 2 is an example screenshot 200 that may be provided on the wireless control device 120 when executing a product control application. The screenshot 200 includes a name field 210 for displaying a name of the lighting load 104 presently being controlled and an intensity field 212 for displaying the present intensity of the controlled lighting load 104. The wireless control device 120 displays a plurality of soft buttons and controls for the user to actuate to control the lighting load 104. The same controls may be implemented using hard buttons that correspond to items in the wireless control device 120 display.

As shown in FIG. 2, the wireless control device 120 displays an on button 220 for turning the lighting load 104 on to the maximum intensity (e.g., approximately 100%), an off button 222 for turning the lighting load 104 off, a raise button 224 for raising the intensity of the lighting load 104 by a predetermined amount, and a lower button 226 for lowering the intensity of the lighting load 104 by a predetermined amount. In addition, the wireless control device 120 displays a virtual slider control 230 having an actuator knob 232 positioned along an elongated vertical slot 234. The user may touch the actuator knob 232 and slide the knob up and down to respectively raise and lower the intensities of the lighting load 104. The wireless control device 120 additionally displays a scroll bar 236 that is moved horizontally to cause the wireless control device 120 to control other lighting loads 104 that may be a part of the lighting control system 100.

In addition to, or alternative to, the soft buttons illustrated in FIG. 2, the wireless control device 120 display may enable user control of the lighting load 104 via text boxes (e.g., direct entry as a percentage of the maximum intensity), drop boxes, checkboxes, radio buttons, or voice activation. In another example embodiment, the user may control the lighting load 104 by tapping or pressing the wireless control device 120 display (e.g., by tapping or holding the wireless control device 120 display to increase or decrease the lighting load 104). The wireless control device 120 display may be used to select the areas (e.g., rooms), lighting units (e.g., lamps), or dimmer switches that the user wishes to control with the wireless control device 120. According to another example embodiment, the control device 120 display may include options for the wireless communication link or RF signals 106 upon which the user may wish to communicate with the dimmer switch 110. The user may set preferences for the type of wireless communication link or RF signals 106 upon which the wireless control device 120 communicates with the dimmer switch 102 based on various factors associated with one or more wireless communication links, e.g., cost, response time, error rate, reliability, etc. For example, if one wireless communication link is more reliable than another, the wireless control device 120 may communicate over the more reliable wireless communication link, if available.

Figure 3:
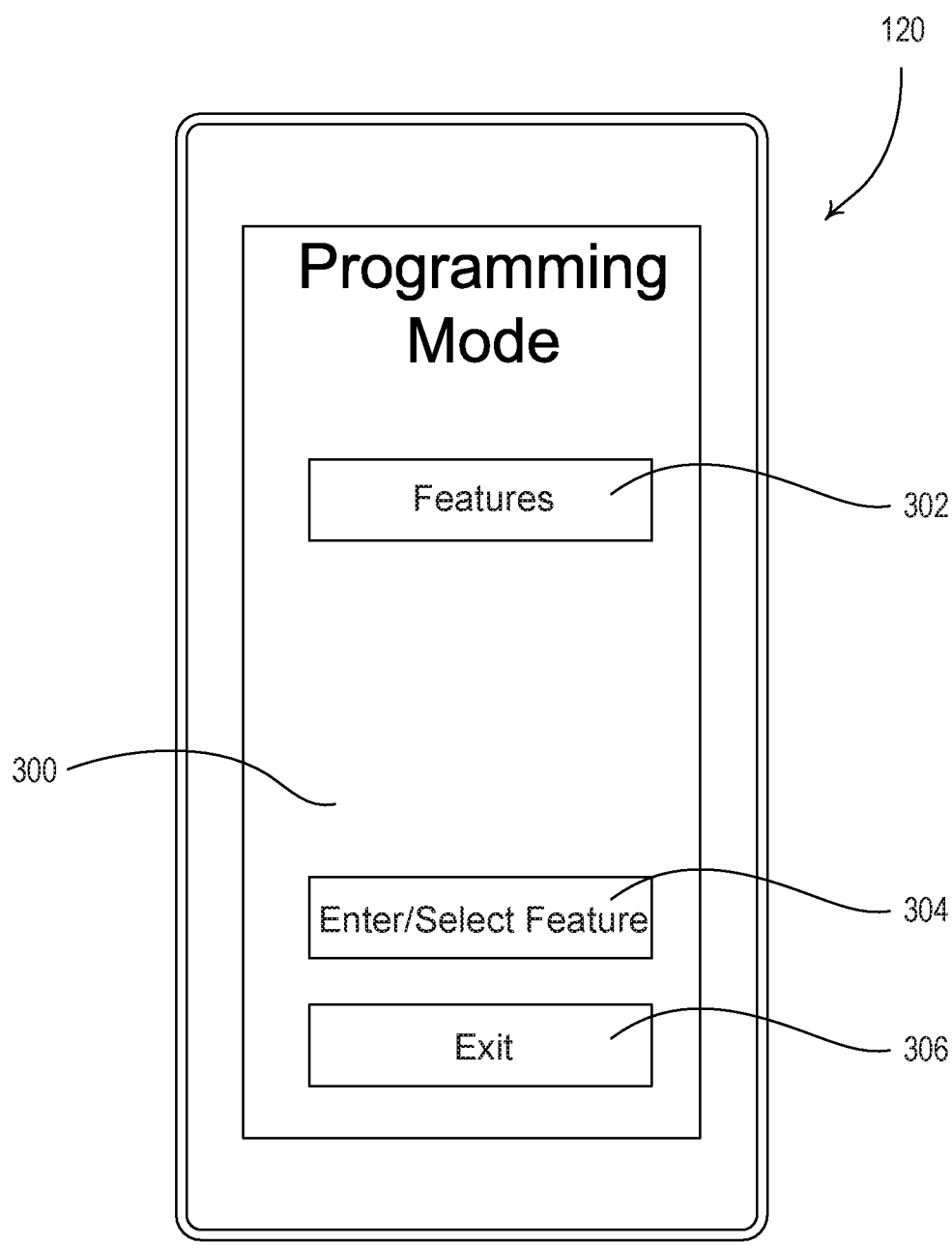
FIG. 3 is an example screenshot that may be provided on the wireless control device for programming the dimmer switch of the RF lighting control system of FIG. 1.

FIG. 3 is an example screenshot 300 that may be provided on the wireless control device 120 upon entering the programming mode for programming the dimmer switch 110. Upon entering the programming mode, the wireless control device 120 may transmit a signal to the dimmer switch 110 to put the dimmer switch 110 into programming mode. While in programming mode, the wireless control device 120 may provide various options for allowing a user to select features to be programmed on the dimmer switch 110. For example, the features may be displayed to a user via the feature display 302. The feature display 302 may include drop-down boxes, text boxes, soft buttons, radio buttons, checkboxes, or the like, that may allow a user to enter or select one or more features that the user wishes to program on the dimmer switch 110. The one or more features may be displayed as options (e.g., a list of features) for being programmed, or they may be recognized by the wireless control device 120 upon receipt of entry from a user (e.g., via a text box). The user may select the one or more features for programming by selecting the enter/select feature button 304. When the user selects the one or more features, the wireless control device 120 may transmit instructions to the dimmer switch 110 that cause the dimmer switch 110 to be programed for performing the selected one or more features. For example, the instructions themselves may include software that enables the dimmer switch 110 to perform the selected features, or the instructions may trigger the dimmer switch 110 to retrieve the software from an external source, such as an external server for example.

The user may exit programming mode by selecting the exit button 306. By exiting the programming mode, the wireless control device 120 may return to other operating modes and/or transmit a signal to the dimmer switch 110 that returns the dimmer switch 110 to its normal operating mode. According to another example embodiment, the wireless control device 120 may exit the programming mode after a prescribed timeout period in which the wireless control device receives no input commands from the user.

Figure 4:
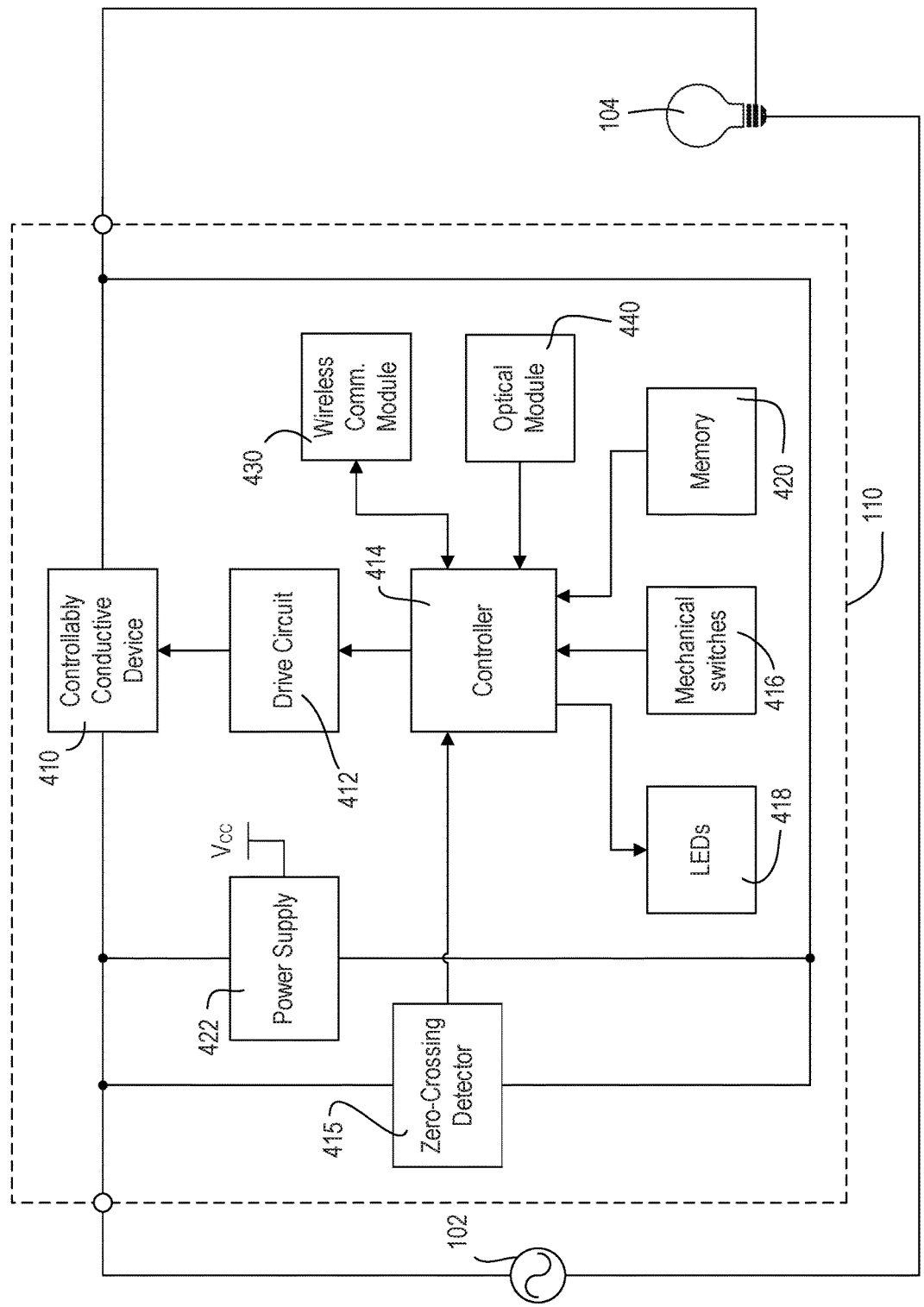
FIG. 4 is a simplified block diagram of the dimmer switch of the RF lighting control system of FIG. 1.

FIG. 4 is a simplified block diagram of the dimmer switch 110. The dimmer switch 110 comprises a controllably conductive device 410 coupled in series electrical connection between the AC power source 102 and the lighting load 104 for control of the power delivered to the lighting load. The controllably conductive device 410 may comprise a relay or other switching device, or any suitable type of bidirectional semiconductor switch, such as, for example, a triac, a field-effect transistor (FET) in a rectifier bridge, or two FETs in anti-series connection. The controllably conductive device 410 includes a control input coupled to a drive circuit 412.

The dimmer switch 110 further comprises a controller 414 coupled to the drive circuit 412 for rendering the controllably conductive device 410 conductive or non-conductive to thus control the power delivered to the lighting load 104. The controller 414 may comprise a microcontroller, a programmable logic device (PLD), a microprocessor, an application specific integrated circuit (ASIC), a field-programmable gate array (FPGA), or any suitable processing device or control circuit. A zero-crossing detector 415 determines the zero-crossings of the input AC waveform from the AC power supply 102. A zero-crossing may be the time at which the AC supply voltage transitions from positive to negative polarity, or from negative to positive polarity, at the beginning of each half-cycle. The controller 414 receives the zero-crossing information from the zero-crossing detector 415 and provides the control inputs to the drive circuit 412 to render the controllably conductive device 410 conductive and non-conductive at predetermined times relative to the zero-crossing points of the AC waveform.

The controller 414 receives inputs from mechanical switches 416 that are mounted on a printed circuit board (not shown) of the dimmer switch 110, and are arranged to be actuated by the toggle actuator 114 and the intensity adjustment actuator 116. The controller 414 also controls light-emitting diodes 418, which are also mounted on the printed circuit board. The light emitting diodes 418 may be arranged to illuminate the status indicators 118 on the front surface of the dimmer switch 110, for example, through a light pipe structure (not shown). The controller 414 is also coupled to a memory 420 for storage of unique identifiers (e.g., the MAC address and the IP address) of the dimmer switch 110, the SSID and the SSID password of the wireless LAN, instructions for controlling the lighting load 104, programming instructions for communicating via a wireless communication link, or the like. The memory 420 may be implemented as an external integrated circuit (IC) or as an internal circuit of the controller 414. A power supply 422 generates a direct-current (DC) voltage Vcc for powering the controller 414, the memory 420, and other low-voltage circuitry of the dimmer switch 110.

The dimmer switch 110 further includes a wireless communication module 430 for transmitting and receiving the RF signals 106 to and from the wireless control device 120 and/or the wireless router 130. For example, the wireless communication module 430 may be configured to communicate via a Wi-Fi communication link, a Wi-MAX communication link, a Clear Connect™ communication link, and/or a Bluetooth® communication link. When the wireless communication module 430 comprises a Wi-Fi module, the controller 414 is operable to control the lighting load 104 in response to received digital messages in Wi-Fi packets (i.e., Internet Protocol packets received via the Wi-Fi signals). The wireless communication module 430 may comprise an RF transceiver and an antenna. Examples of antennas for wall-mounted dimmer switches are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The dimmer switch 110 further comprises an optical module 440, such as an optical signal receiving circuit for example. The optical module 440 may be optically coupled to the optical receiver 119. The optical module 440 may be coupled to the optical receiver 119 on the front surface of the dimmer switch 110, for example, through a light pipe (not shown), such that the optical module 440 may receive the optical signals from the wireless control device 120 via the light pipe. For example, the optical module 440 may comprise a photodiode (not shown) that is responsive to the optical signals transmitted by the wireless control device 120. In addition, the photodiode of the optical module 440 may be controlled by the controller 414, so as to transmit optical signals to the wireless control device 120 (as will be described in greater detail below), for example.

The wireless device 120 may control the controllably conductive device 410 using the optical signals and/or the digital messages received via the RF signals 106. According to an example embodiment, the controller 414 may determine the module from which the signals are received, e.g., from the wireless communication module 430 or the optical module 440, and the controllably conductive device 410 may be controlled based on those signals. The controller 414 may also transmit messages to the wireless control device 120 via optical signals or digital messages transmitted via the RF signals 106. For example, the controller 414 of the dimmer switch 110 may be used to transmit digital messages to the wireless control device 120 via wireless communication. The digital messages may include alerts and/or feedback and status information regarding the lighting load 104. The digital messages may also include error messages or indications as to whether the dimmer switch 110 is able to communicate via a wireless communication link or RF signal 106, for example.

Figure 5:
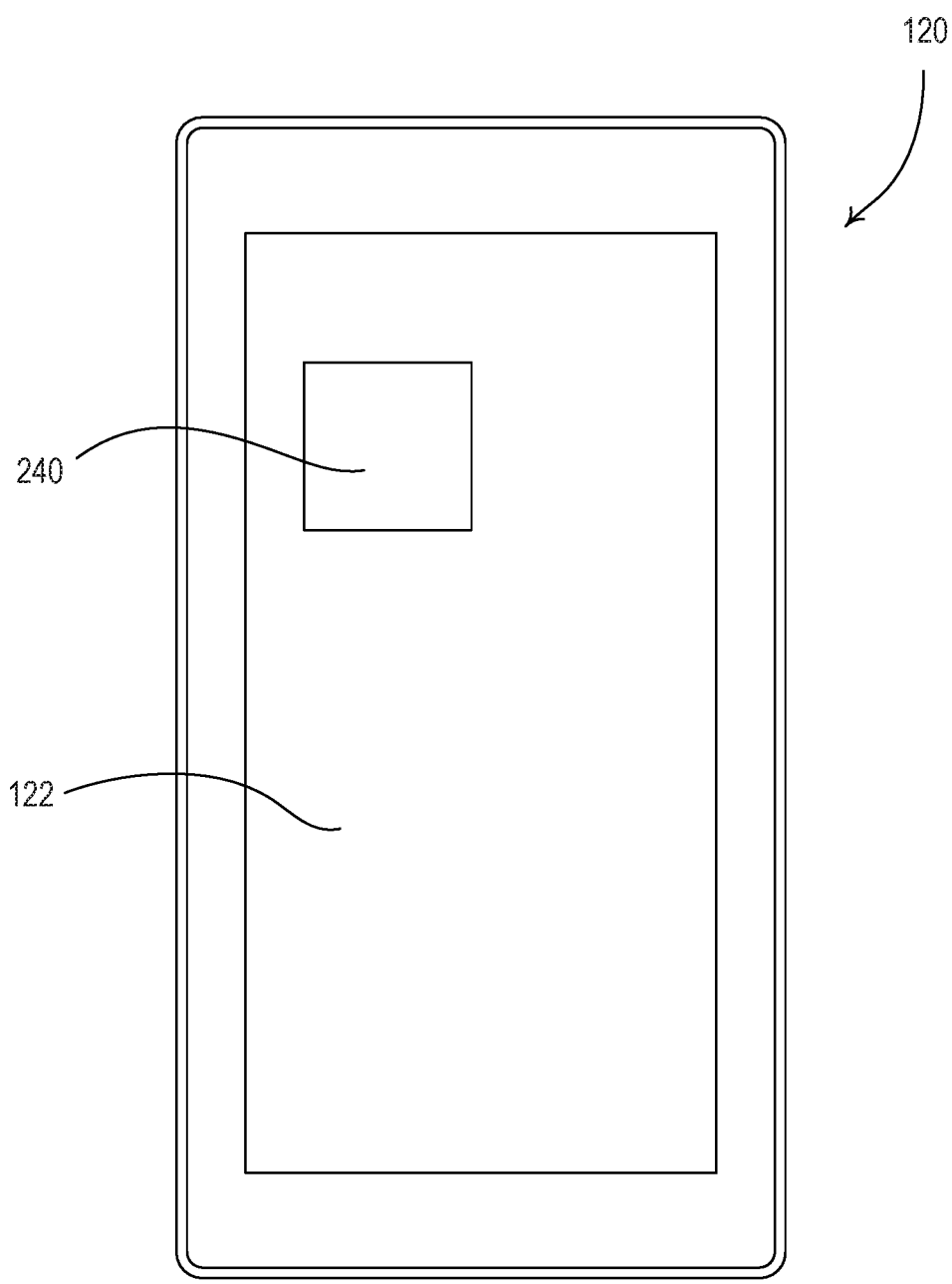
FIG. 5 is a front view of the wireless control device showing an example location of a portion of a display screen that may be used to transmit optical signals.

FIG. 5 is a front view of the wireless control device 120 showing an example location of a portion 240 of the display screen 122 that may be used for transmitting optical signals. The wireless control device 120 may be operable to transmit a digital message via the optical signals by alternating a portion 240 of the display screen 122 between black and white (or two other contrasting colors) to modulate the light output of (i.e., flash) the portion of the display screen. Instead of turning light/dark transitioning of pixels on the display, the backlight may be on/off transitioned for increased bandwidth. While FIG. 5 illustrates a portion 240 of the display screen 122 for transmitting optical signals, other portions of the display screen or the entire display screen may also be used for transmitting the optical signals.

Figure 6:
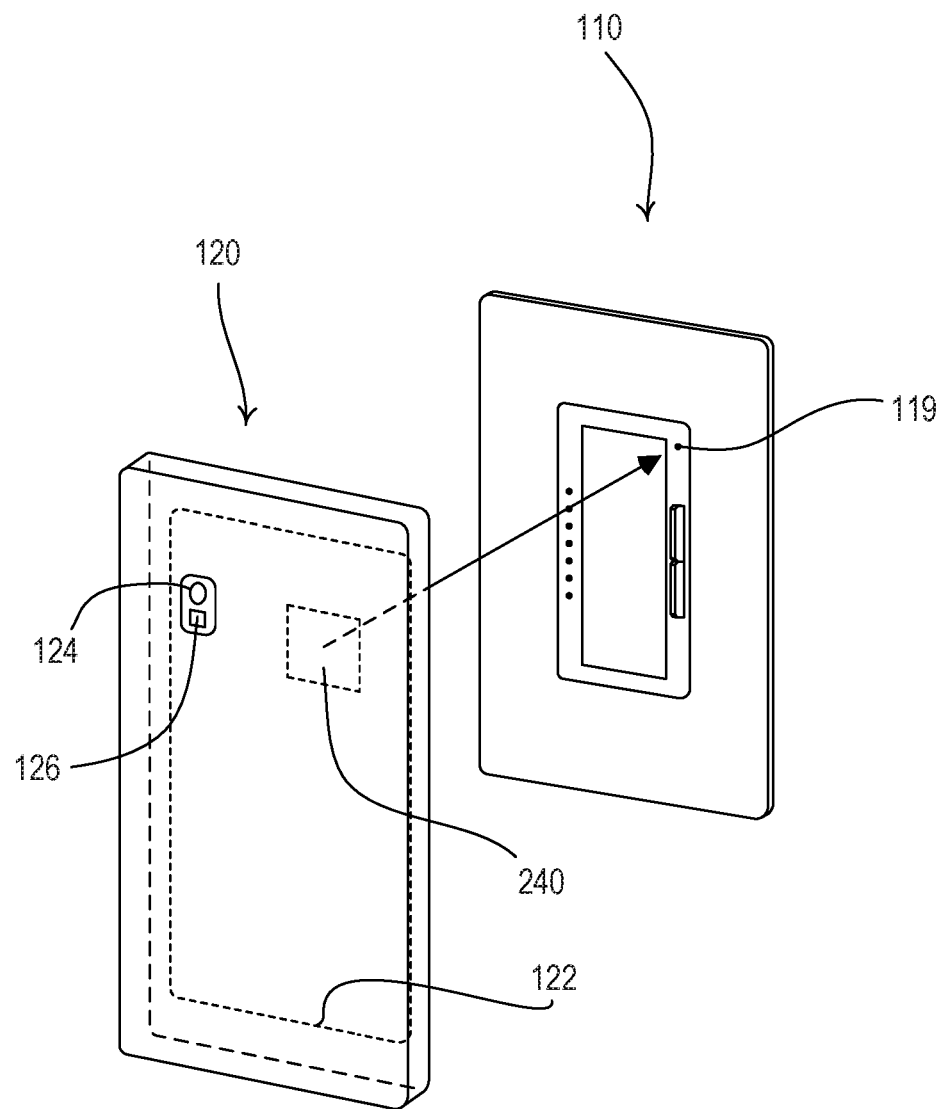
FIG. 6 is a perspective view showing the display screen of the wireless control device directed towards an optical receiver of the dimmer switch while the wireless control device is transmitting the optical signals.

FIG. 6 is a perspective view showing the display screen 122 of the wireless control device 120 directed towards the optical receiver 119 of the dimmer switch 110 while the wireless control device is transmitting the optical signals. The portion 240 of the display screen 122 may be held close to the optical receiver 119 while the wireless control device 120 is transmitting the optical signals to ensure that the optical module 440 receives the optical signals. The proximity of the wireless control device 120 to the optical receiver 119 may be close enough for successfully transmitting the optical signal based on ambient light, the signal-to-noise ratio, error coding, etc. The wireless control device 120 may detect the dimmer switch 110 for performing optical signal communications. For example, the wireless control device 120 may comprise a proximity detector and may begin transmitting the optical signals to the optical module 440 when the wireless control device detects that the wireless control device is a predetermined distance from the dimmer switch 110.

According to another example embodiment, the dimmer switch 110 may be equipped with an electrostatic foam stylus tip, which is located a preset distance from the photodiode, for example. The wireless control device 120 may detect the presence of the stylus tip, correlating the touch location with accelerometer data, to yield the specific display location in which to transmit the data for example. An application on the wireless control device 120 may use the built in proximity sensor as well as the stylus tip to ensure the display flashes when touching the dimmer switch 110 to be programmed. Alternatively, the proximity of the wireless control device 120 may be detected by the dimmer switch 110 and an indication may be transmitted to the wireless control device 120 via the digital message described herein. According to another embodiment, the optical module 440 could be located so as to receive the optical signals through the light pipe structure located between the status indicators 118 and the LEDs 418, such that the separate optical receiver 119 is not required on the front surface of the dimmer switch 110.

Additional bandwidth may be achieved via a tricolor red/green/blue (RGB) photodiode receiver assembly for an approximately three-times increase in bandwidth. For example, the portion 240 of the display screen 122 may be changed between different colors (e.g., red, green, and blue) or even more colors. Multiple bits may be encoded into the transitions from one specific color to another. Transfer rates may be as high as 60 bits/sec using the RGB photodiode receiver, for example.

According to an example embodiment of the present invention, the wireless control device 120 is able to execute the product control application to assign a unique identifier (e.g., the IP address) to the dimmer switch 110, before associating the wireless control device 120 with the dimmer switch, for example. The wireless control device 120 chooses a unique identifier for the dimmer switch 110 that is different than the unique identifier of the wireless control device 120 or any other devices on the wireless LAN. The unique identifier may be stored at the wireless control device 120, the dimmer switch 110, or on any other network entity, for example. The portion 240 of the display screen 122 may be held close to the optical receiver 119 before the wireless control device 120 begins transmitting the unique identifier via optical signals. The display screen 122 may also be used to transmit the SSID and the SSID password to the dimmer switch 110 via the optical signals. When the dimmer switch 110 successfully receives the unique identifier, the SSID, and/or the SSID password from the wireless control device 120, the dimmer switch 110 may connect to the local wireless network. For example, the dimmer switch 110 may connect to a wireless LAN and transmit the MAC address of the dimmer switch to the wireless control device 120. The dimmer switch 110 may provide an indication (e.g., blink the lighting load 104 or provide another indication) that the dimmer switch has successfully connected to the wireless LAN. The wireless control device 120 may transmit and receive the RF signals 106 to and from the dimmer switch 110 to control the lighting load 104.

Figure 7:
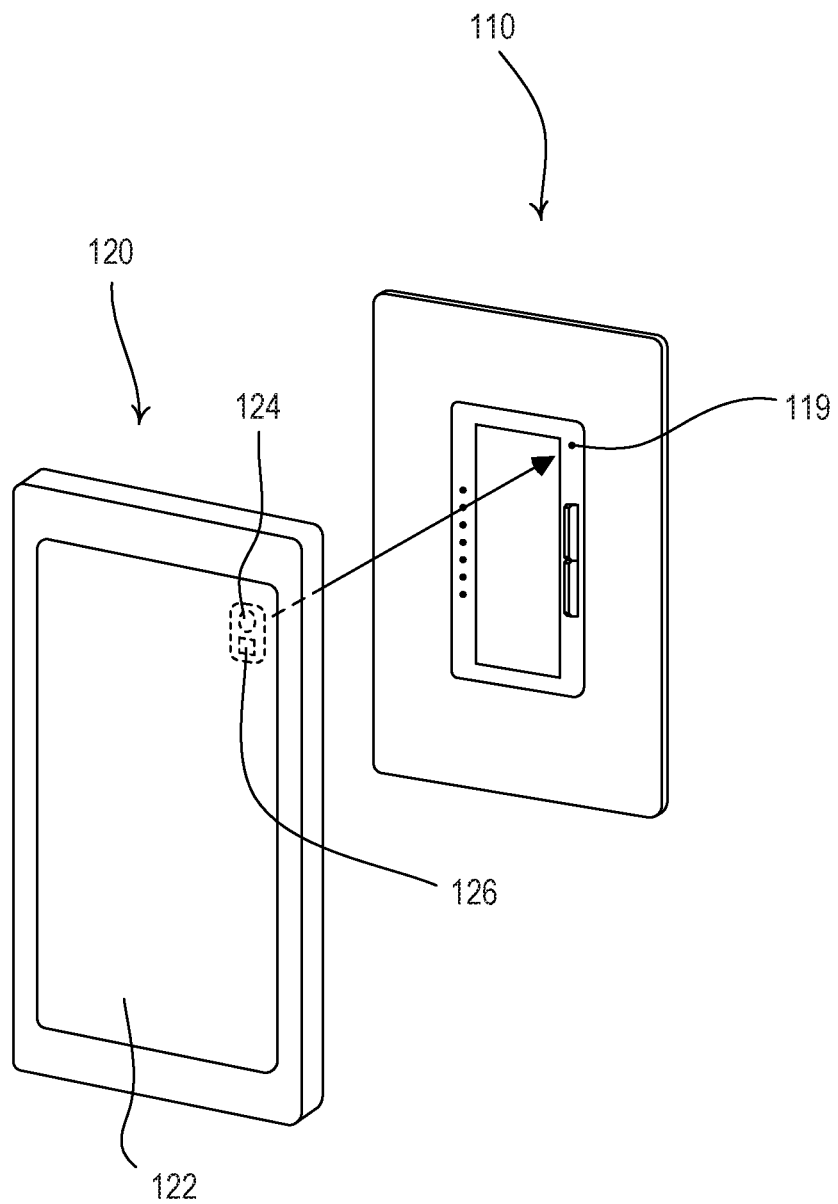
FIG. 7 is a perspective view showing a camera lens and a camera flash light source of the wireless control device directed towards the optical receiver of the dimmer switch according to an example embodiment of the present invention.

According to another alternate embodiment of the present invention, the camera lens 124 and the camera flash light source 126 may be used to transmit and receive optical signals to and from the optical module 440. FIG. 7 is a perspective view showing the camera lens 124 and the camera flash light source 126 of the wireless control device 120 directed towards the optical receiver 119 of the dimmer switch 110 according to embodiments of the present invention described herein. The camera flash light source 126 (which may comprise an LED) is controlled to generate the optical signals to thus transmit the digital messages to the dimmer switch 110. In addition, the photodiode of the optical module 440 of the dimmer switch 110 may be controlled to transmit optical signals. The optical signals may be received by the camera lens 124 of the wireless control device 120. Accordingly, a two-way optical communication link may be established between the dimmer switch 110 and the wireless control device 120.

Figure 8:
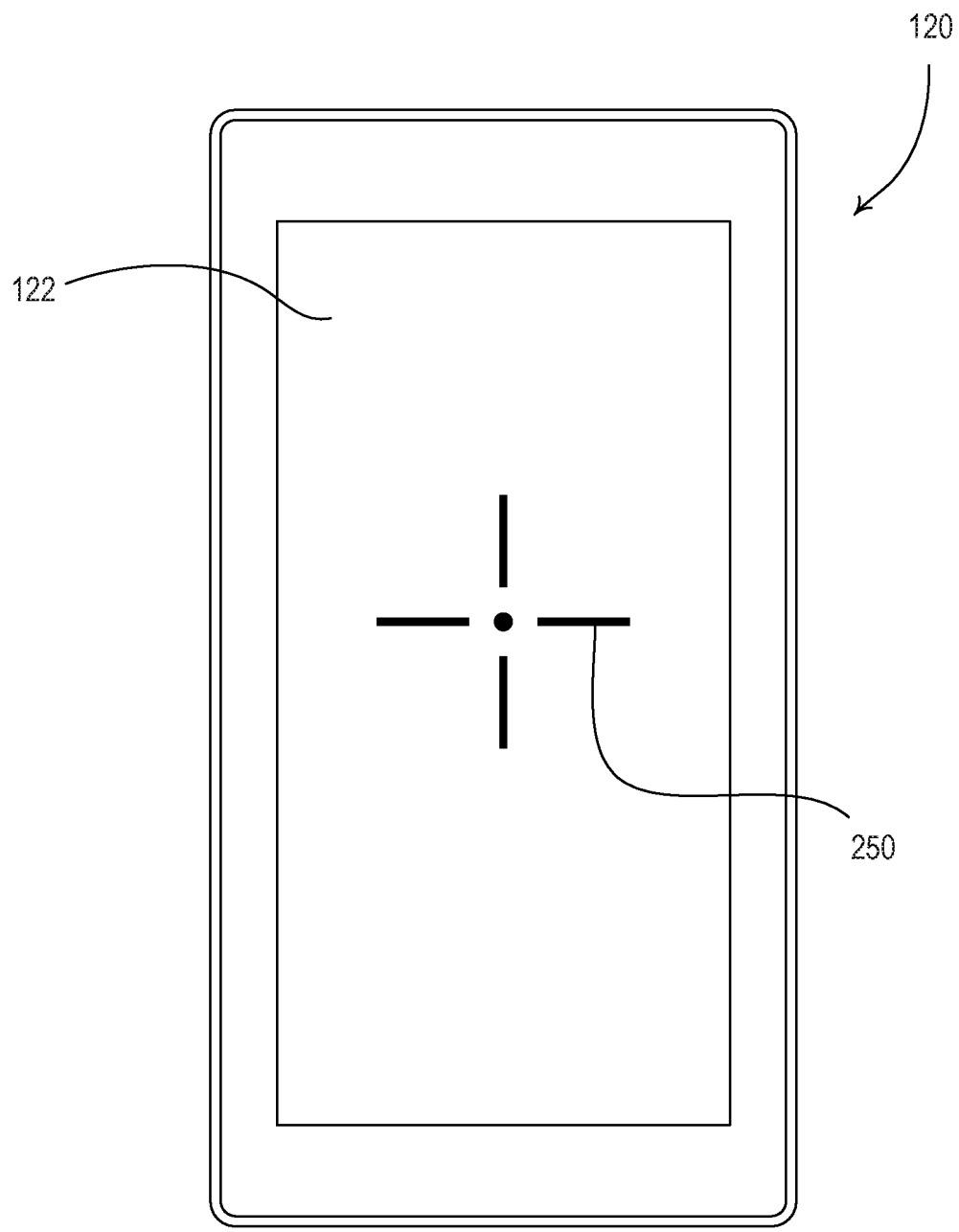
FIG. 8 is a front view of the wireless control device showing an example targeting image for assisting in lining up the camera lens and the camera flash light source with the optical receiver of the dimmer switch according to an example embodiment of the present invention.

As illustrated in FIG. 8, the display screen 122 may display a targeting image (e.g., cross-hairs 250). The target image may assist the user in lining up the camera lens 124, the camera flash light source 126, or the portion 240 of the display screen 122 with the optical receiver 119 of the dimmer switch 110. The display screen 122 may display a message to the user upon making a determination that the camera lens 124 and the camera flash light source 119 are aligned with the optical receiver 119 of the dimmer switch 110. The determination may be made by the wireless control device 120 itself, or the wireless control device 120 may make the determination based on an indication received from the dimmer switch 110. The indication may be received via an optical or other wireless signal for example.

Figure 9:
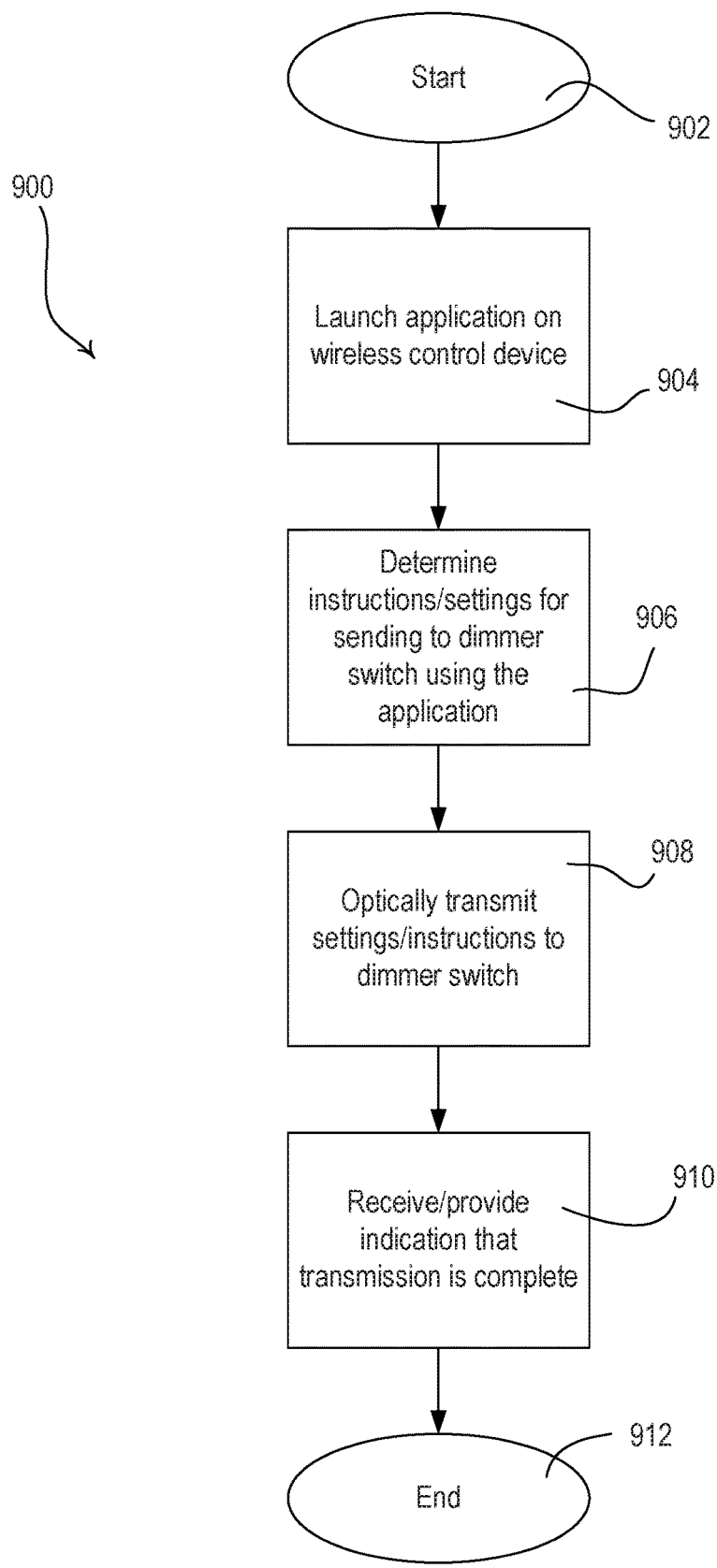
FIG. 9 is a simplified flow diagram illustrating an example embodiment for optically programming or controlling the dimmer switch via the wireless control device.

FIG. 9 is a simplified flow diagram illustrating an example embodiment for optically programming or controlling a dimmer switch 110 via a wireless control device 120. As shown in FIG. 9, a programming or controlling procedure 900 may be started at 902 and the wireless control device 120 may launch an application at 904. The application may display a user interface on the visual display 122 of the wireless control device 120. The application may enable the adjustment of the lighting load 104 or programming of the dimmer switch 110 via the optical signals. For example, the application may determine instructions for controlling or settings for programming the dimmer switch 110 at 806. Various settings or instructions may be input and/or stored to the wireless control device 120 application which may be transmitted to the dimmer switch 110, for example, via an optical signal at 908.

When the wireless control device 120 application completes the transmission, the dimmer switch 110 and/or the wireless control device 120 may provide an indication that the transmission has been completed. For example, the wireless control device 120 may receive an indication or message from dimmer switch 110 and/or provide an indication (e.g., audio alert, visual alert, or vibration) to a user at 910. According to another example embodiment, the dimmer switch 110 may display a message at the dimmer display or provide an indication via the lighting load 104 (e.g., blink the lamp associated with the dimmer) when the transmission has been received and/or processed. After the indication has been provided, the programming or controlling procedure 900 may end at 912.

According to an example embodiment, the wireless control device 120 and the application may be used to setup custom lighting schedules at the dimmer switch 110, such as lighting timer schedules, for example. The user interface provided on the display screen 122 of the wireless control device 120 may provide an easy-to-use interface for configuring the timeclock event times and actions of the timeclock schedule. After the timeclock schedule is configured, the wireless control device 120 may transmit (e.g., via the optical signals) the information defining the timeclock schedule to the dimmer switch 110, which may be stored in the memory 420 in the dimmer switch 110. In addition, the wireless control device 120 may transmit the present time of day (and possible the present time of year) to the dimmer switch 110 when transmitting the timeclock schedule information to thus calibrate the internal clock of the dimmer switch 110.

To transmit the timeclock schedule information, the application may enter a timer program mode and may be placed in close proximity to the dimmer switch 110. The wireless control device 120 may transmit the schedule data to the dimmer switch 110, for example, optically via off/on transitions of the display, which may be similar to the low/hi transitions of a standard serial data stream. When data transfer is complete (e.g., checksums match) the dimmer switch 110 may provide an indication (e.g., audio signal beeps). If data transfer is not successful the programming process may repeat (e.g., 1-n times). If the process fails on the $n^{th}$ attempt an error message (e.g., tone) may indicate a failed programming attempt. The dimmer switch 110 may run the schedules as programmed on the control device 120 application. Additionally, the control device 120 may run the schedules informing the user of the next scheduled event.

According to an example embodiment, the wireless control device 120 and the application may be used to program the dimmer switch 110 for wireless communication (e.g., Wi-Fi communication) via the local area network. The user may use the application to select a desired router or local area network for performing Wi-Fi communications via the dimmer switch 110. For example, the user may enter the name of the dimmer switch 110 for communicating on the local area network. The wireless control device 120 application prompts the user to select a program button, at which time the user may place the wireless control device 120 close to or against the dimmer switch 110 for programming via the optical signal. The optical signal may be received at the dimmer switch 110 via the optical module 440. The wireless control device 120 may transmit the acquired data to the dimmer switch 110, for example, optically via the black/white transitions of the display. Once the dimmer switch 110 successfully receives the data, the dimmer switch may join the network and obtain an IP address, which may become the static IP address of the dimmer switch. Once the dimmer switch 110 has an IP address, the dimmer switch sends a TCP/IP sockets message that includes the IP address, name, and/or serial number of the dimmer switch to the IP address of the wireless control device 120. In addition, the dimmer switch 110 may receive the IP address from the wireless control device 120 via the black/white transitions of the display.

Figure 10:
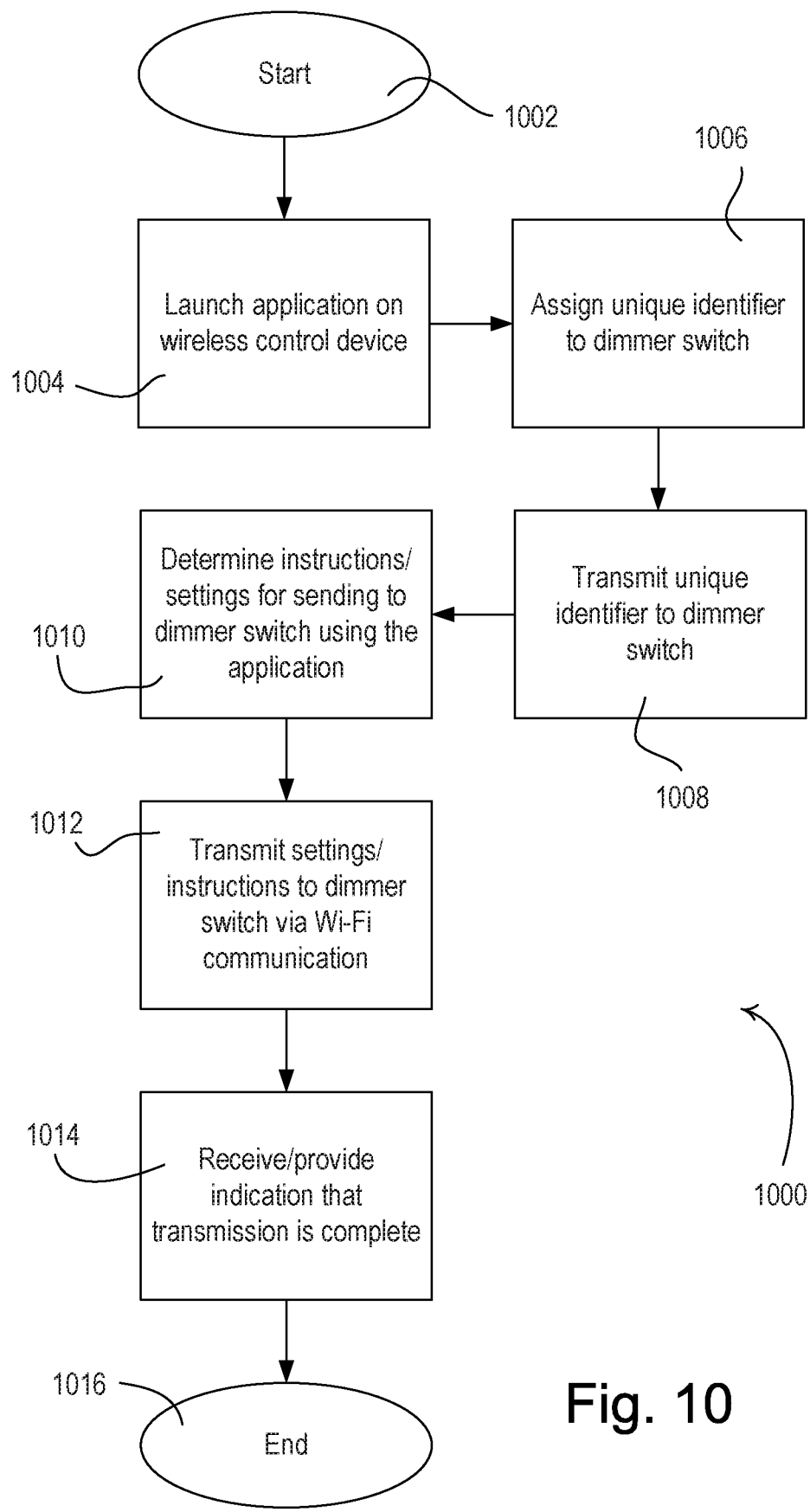
FIG. 10 is a simplified flow diagram illustrating an example embodiment for programming or controlling the dimmer switch via a Wi-Fi signal.

FIG. 10 is a simplified flow diagram illustrating an example embodiment for programming or controlling a dimmer switch 110 using a Wi-Fi signal. As shown in FIG. 10, a programming or control procedure 1000 may be started at 1002 and the wireless control device 120 may launch an application that displays a user interface and enables Wi-Fi communication of user inputs from the wireless control device 120 to the dimmer switch 110 at 1004. The wireless communication module 430 of the dimmer switch 110 may comprise a Wi-Fi module, such as a Wi-Fi receiver for example, to enable Wi-Fi communications. At 1006, the wireless control device 120 may assign a unique identifier (e.g., IP address and/or an SSID and the corresponding password) to the dimmer switch 110. The wireless control device 120 may transmit the unique identifier to the dimmer switch 110 at 1008, for example, via optical signals as described above. The application may determine instructions or settings for programming or controlling the dimmer switch 110 at 1010. Various settings or instructions may be input and/or stored to the wireless control device 120 application which may be transmitted (e.g., via a local area network or point-to-point communication) to the dimmer switch 110 via a Wi-Fi signal at 1012. When the wireless control device 120 completes the transmission, the dimmer switch 110 and/or the wireless control device 120 may provide an indication that the transmission has been completed. For example, the wireless control device 120 may receive an indication or message from dimmer switch 110 and/or provide an indication (e.g., audio alert, visual alert, or vibration) to a user at 1014. After the indication has been provided, the programming or controlling procedure 1000 may end at 1016.

According to an example embodiment, the Wi-Fi signal may include a non-standard Wi-Fi signal used to communicate via a vendor-specific proprietary access point. In this embodiment, the dimmer switch 110 may receive Wi-Fi communications via a vendor-specific beacon implementing a vendor-specific protocol. Using the vendor-specific beacon, vendor proprietary information may be included in the Wi-Fi signal, for example, as embedded information in a portion of the beacon management frame. The commands may be embedded in the beacon management frame using active and directed probe request/response for example.

Figure 11:
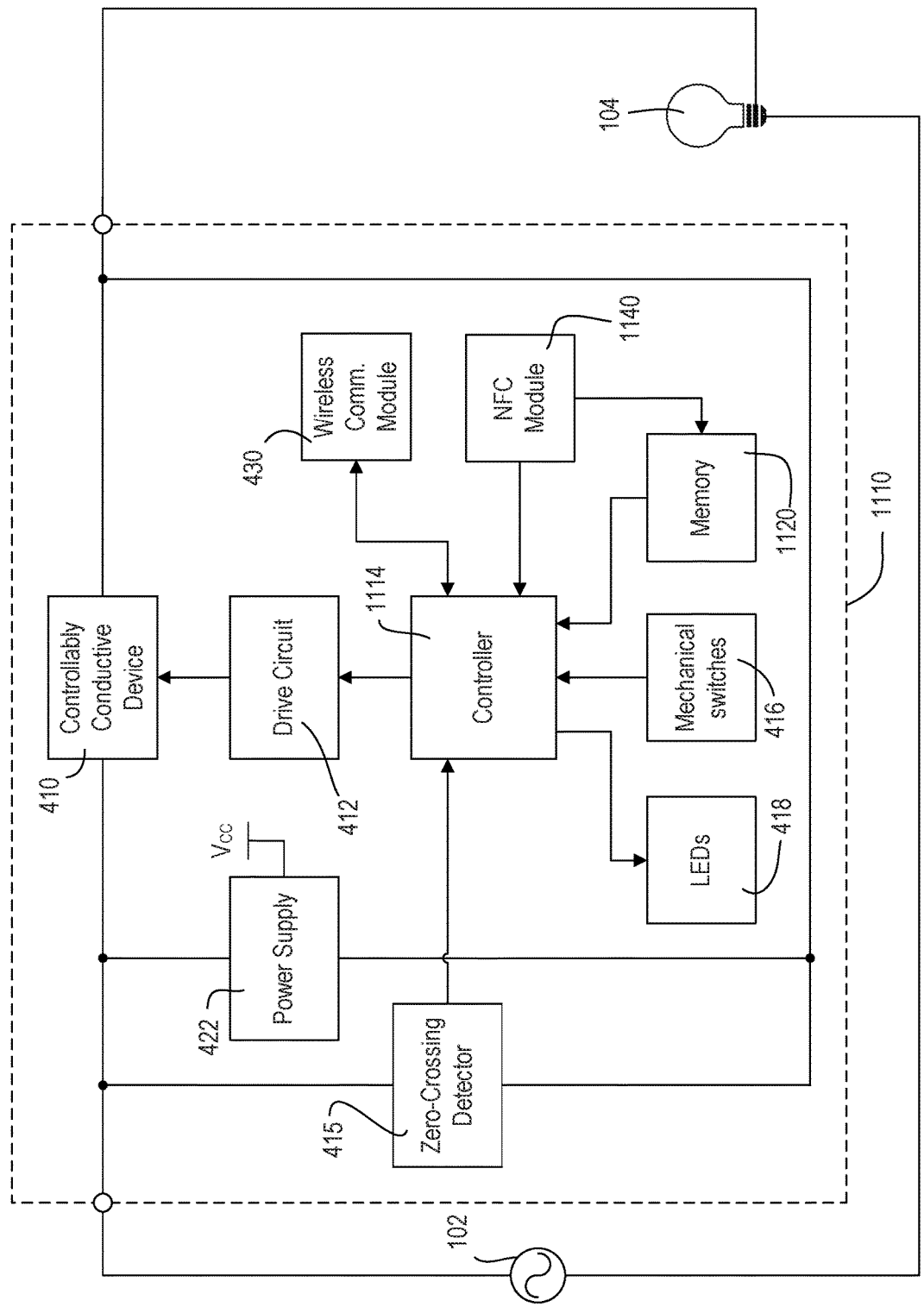
FIG. 11 is a simplified block diagram of a dimmer switch according to an alternate embodiment of the present invention.

FIG. 11 is a simplified block diagram of a dimmer switch 1110 according to an alternate embodiment of the present invention. The dimmer switch 1110 is identical to the dimmer switch 110 as shown in FIG. 4. However, the dimmer switch 1110 comprises an NFC module 1140 for receiving NFC signals from the wireless control device 120. The NFC module 1140 is coupled to a memory 1120 for storing operating parameters of the dimmer switch 1110. The memory 1120 may comprise, for example, an electrically-erasable programmable memory (EEPROM) that may be written to without the use of power (e.g., part number M24LR64-R manufactured by ST Microelectronics). The NFC module 1140 may also be coupled to a controller 1114, which may be operable to control the controllably conductive device 410 to thus control the lighting load 104 in response to the NFC signals.

Figure 12:
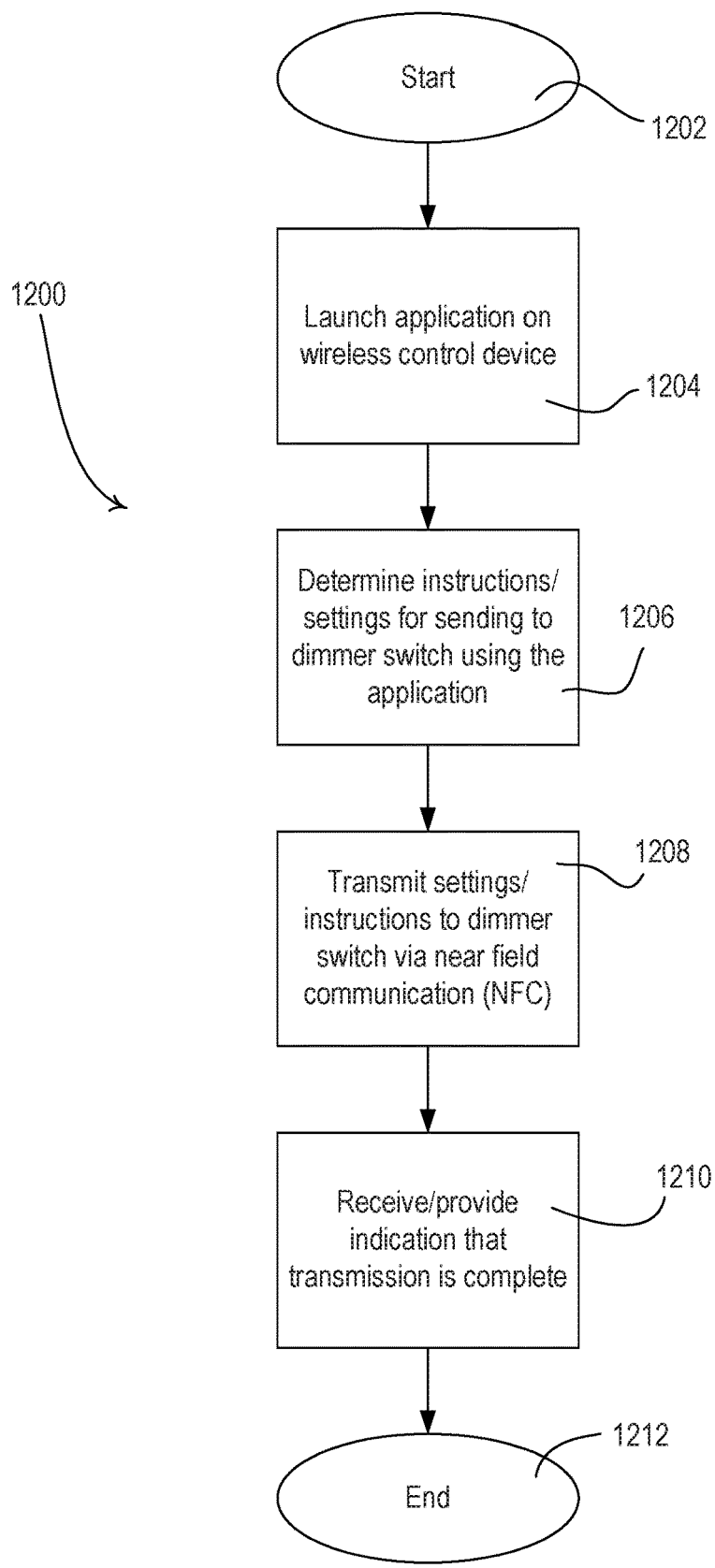
FIG. 12 is a simplified flow diagram illustrating an example embodiment for programming or controlling the dimmer switch via near field communication (NFC) signals.

FIG. 12 is a simplified flow diagram illustrating an example embodiment for programming or controlling the dimmer switch 1110 using NFC signals. As shown in FIG. 12, a programming or control procedure 1200 may be started at 1202 and the wireless control device 120 may launch an application at 1204. The application may displays a user interface on the visual display 122 of the wireless control device and enables receipt of NFC signals from the wireless control device 120 to the dimmer switch 1110. The application may determine instructions or settings for programming or controlling the dimmer switch 1110 at 1206. Various settings or instructions may be input and/or stored to the wireless control device 120 application which may be transmitted to the dimmer switch 1110 via the NFC signals at 1108. The wireless control device 120 may be moved close to the dimmer switch 110 for transmission of the NFC signals. When the wireless control device 120 completes the transmission of the NFC signals, the dimmer switch 1110 and/or the wireless control device 120 may provide an indication that the transmission has been completed. For example, the wireless control device 120 may receive an indication or message from dimmer switch 1210 and/or provide an indication to a user at 1210. After the indication has been provided, the programming or controlling procedure 1200 may end at 1212.

Figure 13:
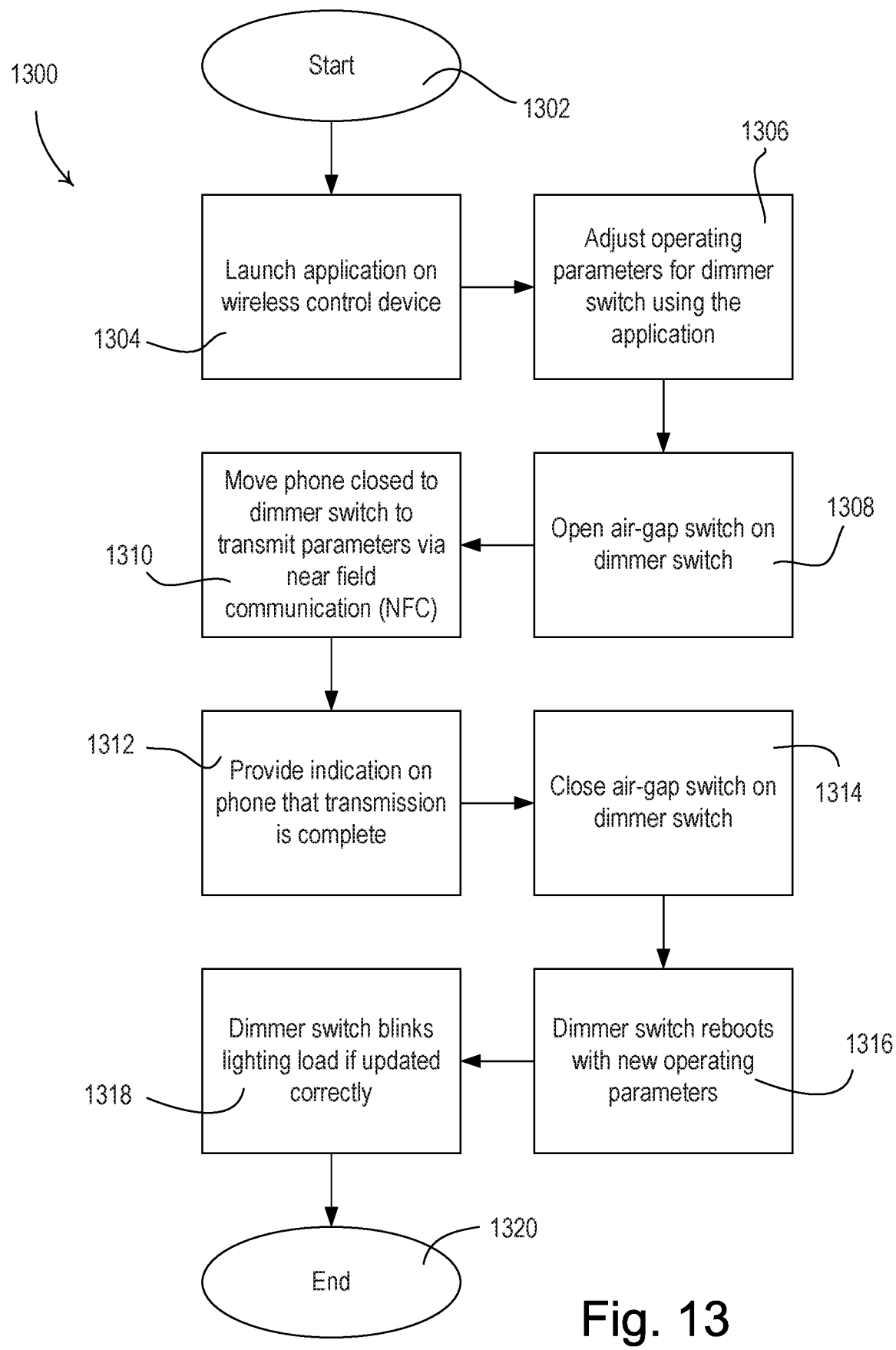
FIG. 13 is a simplified flow diagram illustrating another example embodiment for programming the dimmer switch via the NFC signals.

According to an alternate embodiment, the NFC signals may be transmitted to the dimmer switch 1110 to program the dimmer switch with operating parameters when an airgap switch (not shown) of the dimmer switch 1110 is opened as shown in the simplified flow diagram of FIG. 13. As shown in FIG. 13, a programming procedure 1300 may be started at 1302 and the wireless control device 120 may launch an application at 1304. The user determines settings for programming the dimmer switch 1110 using the application at 1306 and then opens the airgap switch of the dimmer switch at 1308, such that the controller 1114 is unpowered. After the airgap switch is opened at 1308, the wireless control device 120 is moved close to the dimmer switch 1110 for transmission of the NFC signals at 1310. When the wireless control device 120 completes the transmission of the NFC signals, the wireless control device 120 provides an indication that the transmission was completed at 1312. The user closes the airgap switch of the dimmer switch 1110 at 1314, after which the dimmer switch reboots with the new operating parameters at 1316. The dimmer switch 1110 blinks the lighting load 104 at 1318 if the dimmer switch was updated correctly, before the programming procedure 1300 ends at 1320.

Opening the airgap switch during the programming procedure 1300 helps to isolate the dimmer switch 1110 that is being programmed from other dimmer switches that may be installed near that dimmer switch (e.g., ganged with the dimmer switch in the same electrical wallbox), such that the other dimmer switches are not programmed by mistake. For example, the controller 1114 may prevent the NFC module 1140 from writing to the memory 1120 when the controller is powered. However, when the controller 1114 is unpowered, the controller will stop preventing the NFC module from writing to the memory 1120.

The dimmer switch 1110 may be programmed, via the wireless control device 120 for example, to the corresponding low-end and high-end intensities that provide for optimum operation of a particular lamp from a particular manufacturer. Since the operation of a lamp can vary from one lamp to the next (particularly for screw-in compact fluorescent lamps and screw-in light-emitting diode lamps), the wireless control device 120 may retrieve the appropriate the low-end and high-end intensities that correspond to a particular lamp. The information may be retrieved by scanning a barcode on a packaging of the lamp (e.g., using a camera of a smart phone) and then reading the low-end and high-end intensities from the memory 1120 or obtaining low-end and high-end intensities via the Internet, for example. After the wireless control device 120 determines the low-end and high-end intensities of the particular lamp from the retrieved information, the control device 120 programs the dimmer with the appropriate low-end and high-end intensities for the particular lamp. Alternatively, the wireless control device 120 may be operable to program only one of the high-end and low-end intensities or another operating parameter after scanning the barcode of the lamp.

Figure 14:
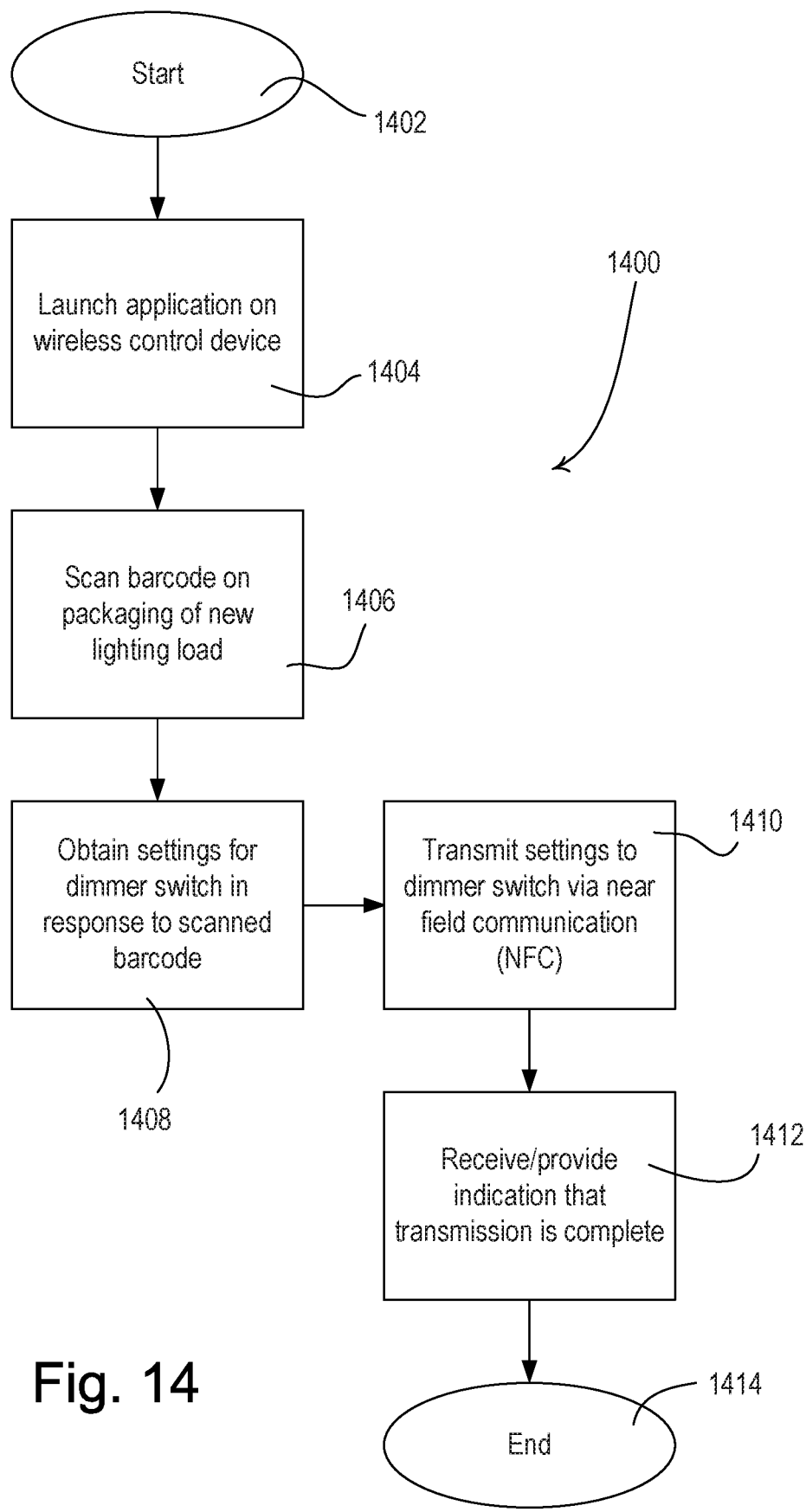
FIG. 14 is a simplified flow diagram illustrating another example embodiment for programming the dimmer switch.

FIG. 14 is a simplified flow diagram of a programming procedure 1400 for programming the low-end and high-end intensities of the dimmer switch 1110 by scanning a barcode of a particular lamp. The programming procedure 1400 is started at 1402 and the wireless control device 120 launches an application at 1404. The user then scans the barcode on the packaging of the lamp at 1406 using, for example, the camera of the wireless control device 120. The application on the wireless control devices 120 obtains the new high-end and/or low-end intensity, for example, from memory or via the Internet at 1408, and then transmits the new high-end and/or low-end intensity to the dimmer switch 1110 via the NFC signals at 1410. When the wireless control device 120 completes the transmission of the NFC signals, the dimmer switch 1110 and/or the wireless control device 120 provides an indication that the transmission has been completed at 1412 and the programming procedure 1400 ends at 1114. While the programming procedure 1400 of FIG. 14 is shown with the wireless control device 120 transmitting NFC signals to the dimmer switch 1110, the wireless control device 120 could alternatively transmit the new high-end and/or low-end intensity to the dimmer switch using Internet Protocol packets or optical signals as shown and described above.

According to an example embodiment, the wireless control device 120 application may use the camera lens 124 (FIG. 6) and a camera flash lighting source 126 (FIG. 6) to take a photograph of a lamp for programming the dimmer switch 1110. The dimmer switch 1110 may be programmed with the corresponding low-end and high-end limits for the photographed lamp. For example, the wireless control device 120 may transmit commands to the dimmer switch 1110 to program the lamp with the low-end and high-end intensities. The control device 120 may analyze the photograph and perform a look-up to determine the limits for the photographed lamp. The look-up may be performed locally or by retrieving information from an external source (e.g., external server) using information obtained during the analysis. According to another embodiment, the control device 120 may send the photograph of the lamp to the external source (e.g., external server) to retrieve the low-end and high-end limit information for the photographed lamp.

Figure 15:
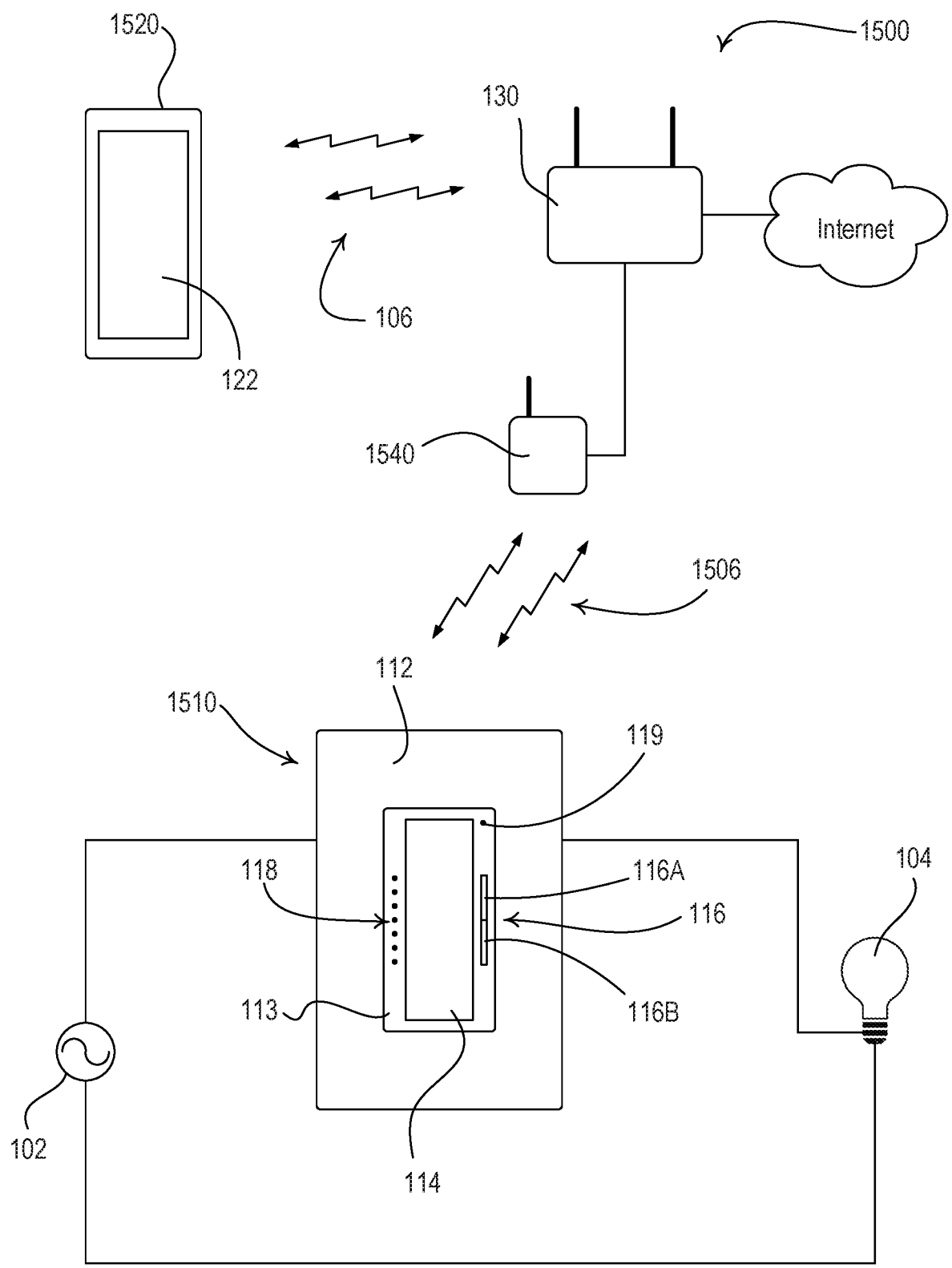
FIG. 15 is a simple diagram of an RF lighting control system that using a proprietary protocol according to an alternate embodiment.

FIG. 15 is a simple diagram of an RF lighting control system 1500 comprising a dimmer switch 1510, a wireless control device 1520, and a gateway device 1540 according to an alternate embodiment. The wireless control device 1520 may be operable to transmit RF signals 106 including Internet Protocol packets to the gateway device 1540 via the wireless router 130. The gateway device 1540 is then operable to transmit digital message according to a proprietary RF communication protocol (such as, for example, the Clear Connect™ protocol) to the dimmer switch 1510 via RF signals 1506. The dimmer switch 1510 includes a wireless communication module operable to receive digital messages according to the proprietary RF communication protocol via the RF signals 1506. In addition, a communication dongle (not shown) could be connected to the wireless control device 1520 to allow for direct communication between the wireless control device 1520 and the dimmer switch 1510 using the proprietary RF communication protocol. For example, the communication dongle could be plugged into a headphone jack on the wireless control device 1520.

Figure 16:
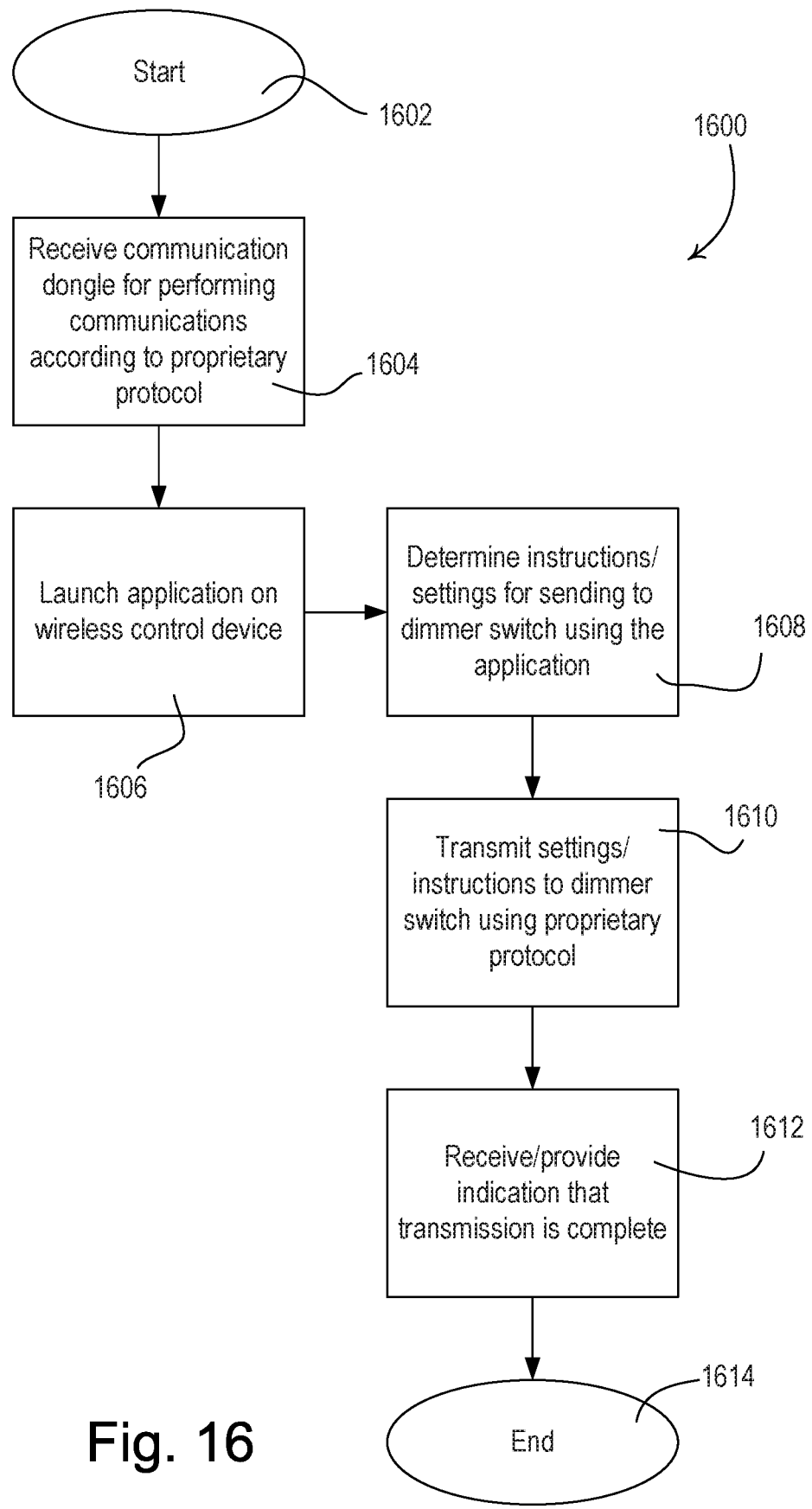
FIG. 16 is a simplified flow diagram illustrating an example embodiment for programming or controlling the dimmer switch using proprietary-protocol communications.

FIG. 16 is a simplified flow diagram illustrating an example embodiment for programming or controlling the dimmer switch 1510 using the proprietary RF communication protocol. As shown in FIG. 16, a programming or control procedure 1600 may be started at 1602 and the wireless control device 1520 may receive the communication dongle at 1604. At 1606, the wireless control device 1520 may launch an application for sending user input and instructions using the proprietary RF communication protocol. The dimmer switch 1510 may be placed into a programming mode for receiving the RF signals 1506 according to the proprietary RF communication protocol and the user may select a dimmer from a list on the wireless control device 1520. The application may determine instructions or settings for programming or controlling the dimmer switch 1510 at 1608.

Various settings or instructions may be input and/or stored to the wireless control device 1520 application which may be transmitted to the dimmer switch 1510 settings or instructions may be transmitted using the proprietary RF communication protocol at 1610. According to an example embodiment, the transmission at 1608 may be performed via a direct communication between the wireless control device 1520 and the dimmer switch 1510 using the communication dongle. When the wireless control device 1520 application completes the transmission, the dimmer switch 1510 and/or the wireless control device 1520 may provide an indication that the transmission has been completed. For example, the wireless control device 1520 may receive an indication or message from dimmer switch 1510 and/or provide an indication to a user at 1612. After the indication has been provided, the programming or control procedure may end at 1614.

According to an alternative embodiment, the transmission at 1610 may be performed via multiple communications, such as a non-proprietary-protocol communication (e.g., Wi-Fi) between the wireless control device 1520 and the gateway device 1540 and a proprietary-protocol communication from the gateway device 1540 to the dimmer switch 1510, for example. In this embodiment, the communication dongle may not be used or even received at 1604.

Figure 17:
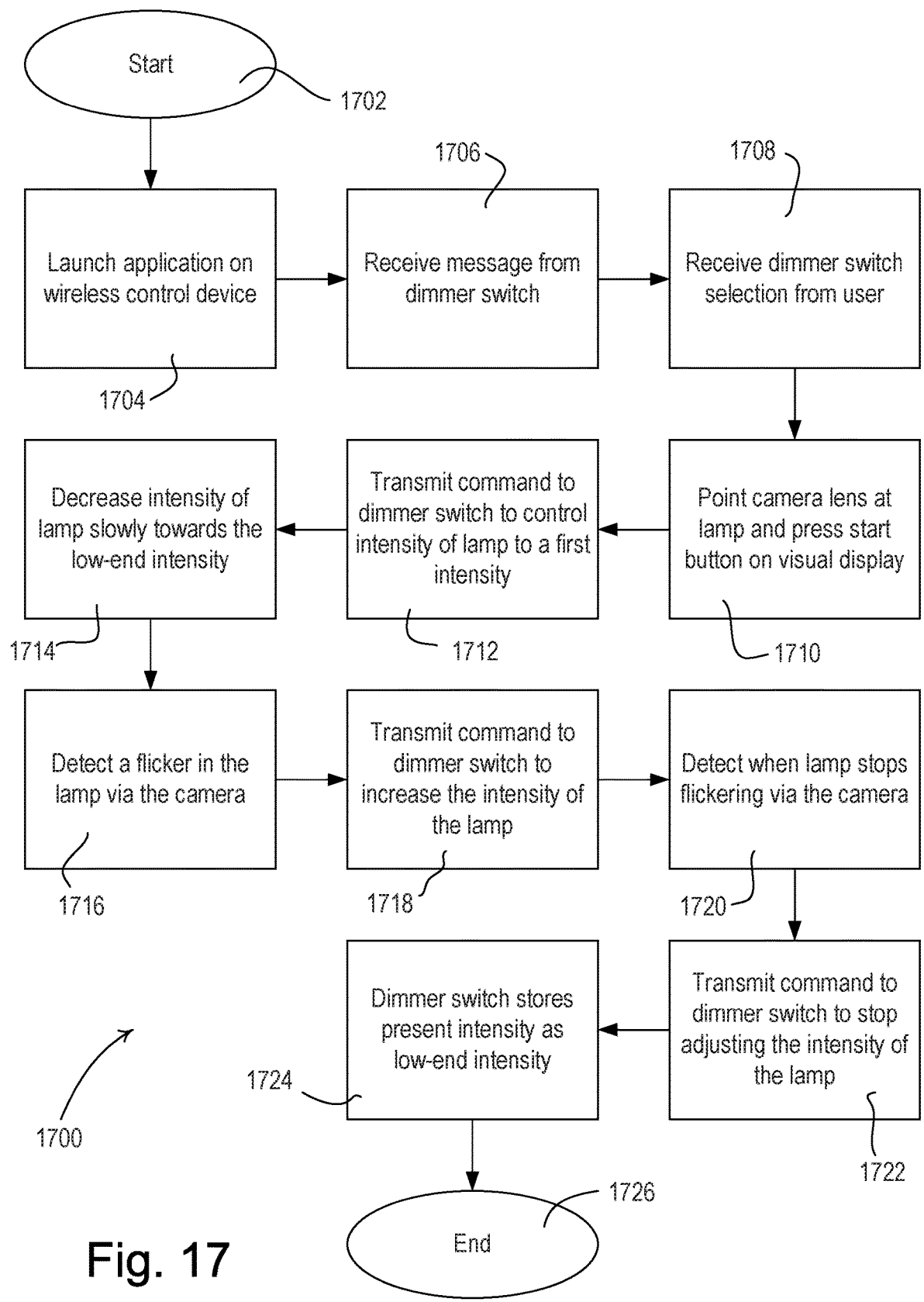
FIG. 17 is a simplified flow diagram illustrating an example embodiment for programming the dimmer switch to corresponding low-end and high-end limits for a particular lamp.

FIG. 17 is a simplified flow diagram illustrating an example embodiment for programming the dimmer switch 1510 using the wireless control device 1520 to have an appropriate low-end intensity for a particular lamp. As shown in FIG. 17, a programming procedure 1700 may be started at 1702 and the wireless control device 120 may launch an application at 1704 that displays a user interface for configuring the dimmer switch 1510 to the corresponding limits for a particular lamp. The dimmer switch 1510 may be placed into a programming mode (e.g., pressing or holding a button on the dimmer switch). The dimmer switch 1510 may repetitively transmit out a "programming mode" digital message that may be received by the wireless control device 1520 at 1706. The wireless control device 1520 may display the information regarding the dimmer switch 1510 that is received in the programming message on the visual display 122 (e.g., a list of dimmer switches). The wireless control device 1520 receives a user selection of the dimmer switch 1510 from the list of dimmer switches at 1708.

The user then points the camera lens 124 (FIG. 6) of the wireless control device 1520 at the lamp being controlled by the dimmer switch 1510 and actuates a start button displayed on the visual display 122 at 1710. The wireless control device 1520 may then transmit commands to the dimmer switch 1510 at 1712 to control the intensity of the lamp to a first intensity (e.g., approximately 50%-100%). The dimmer switch 1510 then slowly begins to decrease the intensity of the lamp towards the low-end intensity at 1714. When the dimmer switch 1510 tries to control the intensity of the lamp below the lowest intensity to which the lamp may be controlled, the lamp may begin to flicker. The application on the wireless control device 1520 may use the camera lens 124 (FIG. 6) and the camera flash lighting source 126 (FIG. 6) to detect the flicker in the lamp. When the flicker has been detected at 1716, the wireless control device 1520 may transmit a command to the dimmer switch 1510 at 1718 to begin slowly increasing the intensity of the lamp. When the wireless control device 1520 detects that the lamp has stopped flickering at 1720, the wireless control device 1520 may transmit a command to the dimmer switch 1510 at 1722 to stop adjusting the intensity of the lamp. The dimmer switch 1520 then stores the present intensity of the lamp as a new low-end intensity at 1724, before the programming procedure 1700 ends at 1726. When the wireless control device 1520 application completes the programming, the dimmer switch 1510 and/or the wireless control device 1520 may provide an indication that the load limit programming has been completed.

While the present application has been described with reference to the dimmer switches 110, 1110, 1510, and the wireless control devices 120, 1520, the concepts of the present invention could be applied to any control devices that are operable to communicate with each other, such as, for example, dimming ballasts for driving gas-discharge lamps; light-emitting diode (LED) drivers for driving LED light sources; screw-in luminaires including integral dimmer circuits and incandescent or halogen lamps; screw-in luminaires including integral ballast circuits and compact fluorescent lamps; screw-in luminaires including integral LED drivers and LED light sources; electronic switches, controllable circuit breakers, or other switching devices for turning appliances on and off; plug-in load control devices, controllable electrical receptacles, or controllable power strips for each controlling one or more plug-in loads; motor control units for controlling motor loads, such as ceiling fans or exhaust fans; drive units for controlling motorized window treatments or projection screens; motorized interior or exterior shutters; thermostats for a heating and/or cooling systems; temperature control devices for controlling setpoint temperatures of HVAC systems; air conditioners; compressors; electric baseboard heater controllers; controllable dampers; humidity control units; dehumidifiers; water heaters; pool pumps; televisions; computer monitors; audio systems or amplifiers; generators; electric chargers, such as electric vehicle chargers; an alternative energy controllers; occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, and central control transmitters.

Although the present invention has been described in relation to particular embodiments thereof, many other variations and modifications and other uses will become apparent to those skilled in the art. It is preferred, therefore, that the present invention be limited not by the specific disclosure herein, but only by the appended claims. Additionally, the embodiments described herein may be implemented as a set of computer-executable instructions stored on a computer-readable medium, such as a random-access or read-only memory for example. Such computer-executable instructions may be executed by a processor or microcontroller, such as a microprocessor, within the dimmer switch 110 or the wireless control device 120, for example.

What is claimed is:

1. A load control system comprising:
  a plurality of load control devices, each of the plurality of load control devices including control circuitry, memory circuitry, and a controllably conductive device couplable in series between a power source and an electrical load, wherein the control circuitry included in at least one load control device to:
    discover the remaining load control devices in the plurality of load control devices; and
    create a wireless network of the plurality of load control devices, the wireless network to provide bidirectional communication between the plurality of load control devices using a first communication protocol; and
  a control device to:
    form a secure wireless communication link with control circuitry in a first load control device included in the plurality of load control devices, the secure wireless communication link using a second communication protocol different from the first communication protocol;
    connect with the control circuitry in the first load control device via the secure wireless communication link;
    transmit to the control circuitry in the first load control device, via the secure wireless communication link, one or more control instructions for storage in the memory circuitry of a second load control device included in the plurality of load control devices;
    cause the control circuitry in the first load control device to communicate, via the wireless network, the one or more control instructions to the second load control device;
    transmit to the control circuitry in the first load control device, via the secure wireless communication link, an instruction to cause the second load control device to execute the at least one control instruction; and
    cause the control circuitry in the first load control device to communicate the received instruction to the control circuitry in the second load control device via the wireless network.

2. The load control system of claim 1, wherein the control device causes the control circuitry in the first load control device to:
  install a software access point to provide the secure wireless communication link via a direct wireless point-to-point communication link; and
  operate as an access point for the control device to access the wireless network.

3. The load control system of claim 1, wherein the control device is a mobile phone.

4. The load control system of claim 1, wherein the wireless network is a peer-to-peer network.

5. The load control system of claim 1, wherein the wireless network is an IP network.

6. The load control system of claim 1, wherein the secure wireless communication link comprises a Bluetooth link.

7. The load control system of claim 1, wherein the load control device is lighting control device, and wherein the electrical load is a lighting load.

8. A method of programming a load control device included in a plurality of load control devices, each of the plurality of load control devices including control circuitry, memory circuitry, and a controllably conductive device couplable between a power supply and an electric load device, the method comprising:
  discovering, by control circuitry in a first load control device included in the plurality of load control devices, each of the remaining plurality of load control devices;
  creating by the control circuitry in the first load control device, a wireless network of the plurality of load control devices to provide bidirectional communication between the plurality of load control devices using a first communication protocol;
  forming, by a control device external to the plurality of load control devices, a secure wireless communication link with control circuitry in a first load control device included in the plurality of load control devices, the secure wireless communication link using a second communication protocol different from the first communication protocol;
  connecting the control circuitry in the first load control device with a control device via the secure wireless communication link;
  transmitting one or more control instructions for storage in the memory circuitry of a second load control device included in the plurality of load control devices, from the control device to the control circuitry in the first load control device via the secure wireless communication link;

causing, by the control device, the control circuitry in the first load control device to communicate, via the wireless network, the one or more control instructions to the second load control device;

transmitting, to the control circuitry in the first load control device, via the secure wireless communication link, an instruction to cause the control circuitry in the second load control device to execute the at least one control instruction; and causing, by the control device, the control circuitry in the first load control device to communicate the received instruction to the control circuitry in the second load control device via the wireless network.

9. The method of claim 8, further comprising:

installing, by the control device, a software access point on the first load control device to provide the secure wireless communication link via a direct wireless point-to-point communication link with the control device; and causing, by the control device, the control circuitry in the first load control device to operate as an access point for the control device to access the network.

10. The method of claim 8, wherein the control device is a mobile phone.

11. The method of claim 8, wherein the wireless network is a peer-to-peer network.

12. The method of claim 8, wherein the wireless network is an IP network.

13. The method of claim 8, wherein the secure wireless communication link comprises a Bluetooth link.

14. The method of claim 8, wherein the load control device is lighting control device, and wherein the electrical load is a lighting load.

* * * * *